(12) United States Patent
Kakegawa

(10) Patent No.: US 7,194,339 B2
(45) Date of Patent: Mar. 20, 2007

(54) METHOD OF CONTROLLING MOTOR, MOTOR CONTROL DEVICE, AND PRINTING METHOD

(75) Inventor: Tomoyoshi Kakegawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 168 days.

(21) Appl. No.: 11/094,819

(22) Filed: Mar. 31, 2005

(65) Prior Publication Data
US 2005/0240293 A1 Oct. 27, 2005

(30) Foreign Application Priority Data
Mar. 31, 2004 (JP) ............... 2004-105569
Mar. 3, 2005 (JP) ............... 2005-059142

(51) Int. Cl.
*G05D 3/12* (2006.01)
*H02P 7/285* (2006.01)

(52) U.S. Cl. ................. 700/286; 388/835

(58) Field of Classification Search ........ 700/286, 700/287, 170, 63, 188; 388/835, 816, 830, 388/853
See application file for complete search history.

(56) References Cited

U.S. PATENT DOCUMENTS

| | | | | |
|---|---|---|---|---|
| 5,194,790 A | * | 3/1993 | Niimi | 318/567 |
| 5,493,502 A | * | 2/1996 | Niwa | 700/188 |
| 5,684,374 A | * | 11/1997 | Chaffee | 318/616 |
| 5,798,626 A | * | 8/1998 | Liska et al. | 318/562 |
| 6,278,906 B1 | * | 8/2001 | Piepmeier et al. | 700/250 |
| 6,566,835 B1 | * | 5/2003 | Yoshida et al. | 318/569 |
| 6,719,396 B2 | * | 4/2004 | Anzai | 347/19 |
| 6,922,607 B2 | * | 7/2005 | Yamazaki et al. | 700/188 |
| 2002/0068990 A1 | * | 6/2002 | Yamazaki et al. | 700/187 |
| 2004/0052565 A1 | * | 3/2004 | Takeishi et al. | 400/283 |

FOREIGN PATENT DOCUMENTS

| | | |
|---|---|---|
| JP | 2003-079172 A | 3/2003 |
| JP | 2003-079178 A | 3/2003 |

* cited by examiner

*Primary Examiner*—Thomas Pham
(74) *Attorney, Agent, or Firm*—Sughrue Mion, PLLC

(57) ABSTRACT

A motor-controlling method includes the steps of: preparing a motor control device provided with a motor for moving an object to be moved and causing the motor to move the object to a target position by first accelerating the object and then moving the object at a constant velocity; storing in advance an acceleration-period power consumption value corresponding to a power consumption of the motor during the accelerating movement; storing in advance a current value of a current flowing through the motor when the object is moved at the constant velocity; detecting a time for which the object is moved at the constant velocity when the object is moved to the target position; calculating a constant-velocity-period power consumption value corresponding to a power consumption of the motor during the constant velocity movement of the object based on the time that has been detected and the current value; and calculating a power consumption of the motor for a period during which the object is moved to the target position based on the acceleration-period power consumption value and the constant-velocity-period power consumption value.

20 Claims, 17 Drawing Sheets

ACCELERATION-PERIOD HEAT GENERATION AMOUNT TABLE

| CARRY AMOUNT | CARRY MODE | Qbase | ACCELERATION PERIOD |
|---|---|---|---|
| GREATER THAN 400mm | PS0 | Qb0 | ta0 |
| 300~400mm | PS1 | Qb1 | ta1 |
| 200~300mm | PS2 | Qb2 | ta2 |
| 100~200mm | PS3 | Qb3 | ta3 |
| 50~100mm | PS4 | Qb4 | ta4 |
| LESS THAN 50mm | PS5 | Qb5 | ta5 |

(DURING NORMAL OPERATION)

(DURING HEAT GENERATION RESTRICTION CONTROL)

NORMAL PRINT AREA

NARROW PRINT AREA

PRINT AREA FOR BORDERLESS PRINTING

METHOD OF CONTROLLING MOTOR, MOTOR CONTROL DEVICE, AND PRINTING METHOD

CROSS-REFERENCE TO RELATED APPLICATIONS

The present application claims priority upon Japanese Patent Application No. 2004-105569 filed on Mar. 31, 2004 and Japanese Patent Application No. 2005-059142 filed on Mar. 3, 2005, which are herein incorporated by reference.

BACKGROUND OF THE INVENTION

1. Field of the Invention

The present invention relates to methods of controlling motors, motor control devices, and printing methods.

2. Description of the Related Art

Printers are provided with various types of motors, including carriage motors for moving a carriage and carry motors for carrying paper. When being driven, such motors generate heat in accordance with their power consumption. When the motor temperature becomes high due to this heat, then this may lead to damage to the motor. Accordingly, it is necessary to monitor the motor temperature.

One way to detect the motor temperature is to detect the motor temperature by providing a temperature sensor. However, this increases the number of parts and therefore leads to higher costs. Then there is the method of estimating the motor temperature based on the value of the current flowing through the motor when the motor is being driven, as disclosed in JP 2003-79178A.

Incidentally, motors used in printers move an object to be moved to a target position by first accelerating the object to be moved and then moving it at a constant velocity. During this period, the current flowing through the motor is not uniform. Therefore, the issue here is how to estimate the motor temperature from such a changing current.

In JP 2003-79178A, the constant current value during the movement at constant velocity is taken to be IFuka, the current value of an inertia component is taken to be Ibase, and the heat generation amount Qpass ($=Ipass^2 \times t$) is calculated from an effective current value Ipass obtained by adding IFuka and Ibase.

In JP 2003-79178A, current values Ibase of the inertia component are stored in correspondence with the movement distances and the movement velocities of the object to be moved. However, if the range of movement distances or movement velocities of the object to be moved is large, then the amount of data to be stored becomes large.

SUMMARY OF THE INVENTION

It is an object of the present invention to improve the above-described technology and to reduce the amount of data to be stored.

An aspect of the present invention is a method of controlling a motor, comprising the steps of: preparing a motor control device provided with a motor for moving an object to be moved, the motor control device causing the motor to move the object to be moved to a target position by first accelerating the object to be moved and then moving the object to be moved at a constant velocity; storing in advance an acceleration-period power consumption value corresponding to a power consumption of the motor during the accelerating movement; storing in advance a current value of a current flowing through the motor when the object to be moved is moved at the constant velocity; detecting a time for which the object to be moved is moved at the constant velocity when the object to be moved is moved to the target position; calculating a constant-velocity-period power consumption value corresponding to a power consumption of the motor during the constant velocity movement of the object to be moved based on the time that has been detected and the current value; and calculating a power consumption of the motor for a period during which the object to be moved is moved to the target position based on the acceleration-period power consumption value and the constant-velocity-period power consumption value.

Other features of the present invention shall become clearer through the following description taken in conjunction with the accompanying drawings.

DETAILED DESCRIPTION OF THE INVENTION

Figure 1:
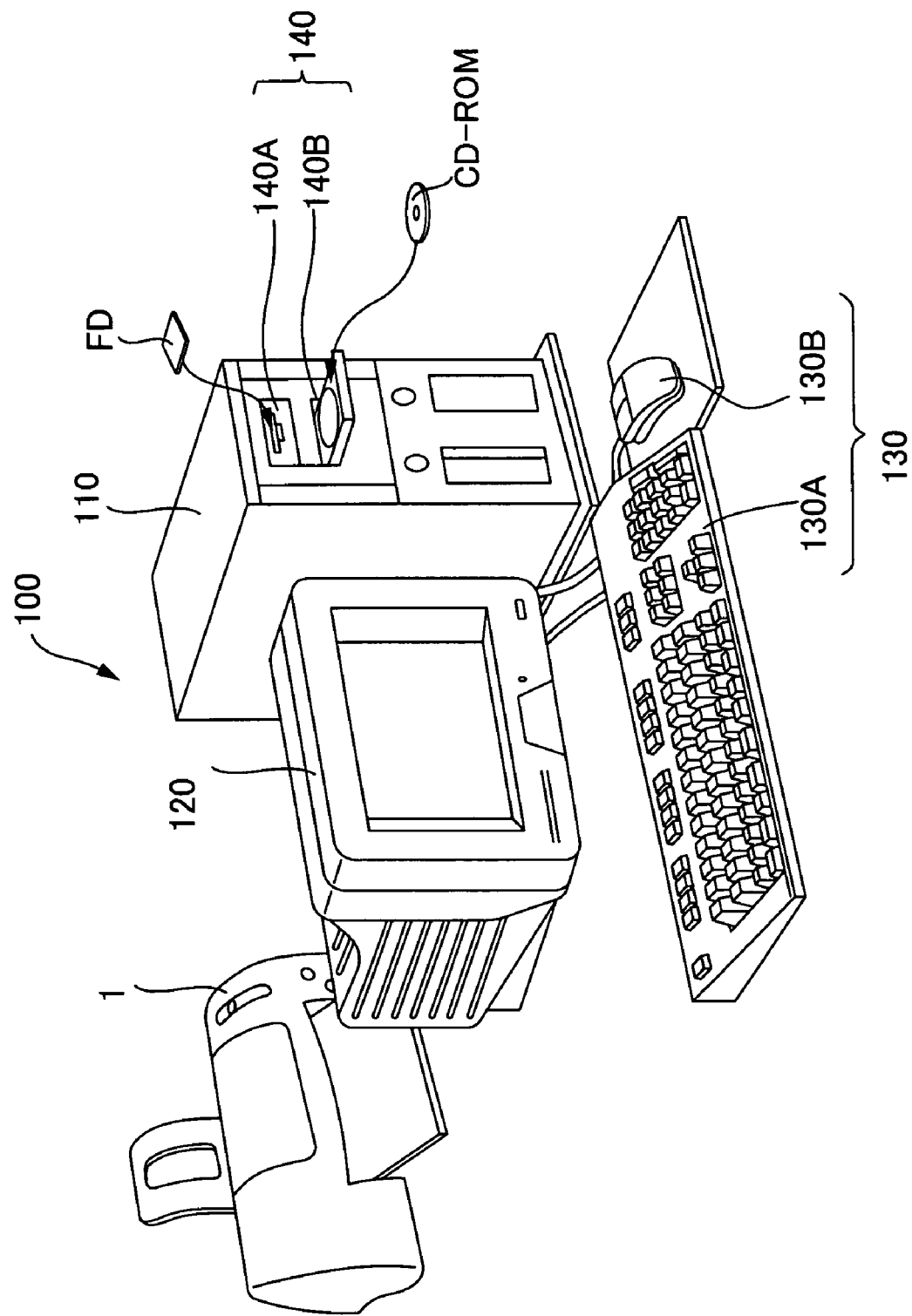
FIG. 1 is an explanatory diagram of the overall configuration of a printing system.

At least the following matters will be made clear by the description below and the accompanying drawings.

A method of controlling a motor, comprises the steps of:

preparing a motor control device provided with a motor for moving an object to be moved, the motor control device causing the motor to move the object to be moved to a target position by first accelerating the object to be moved and then moving the object to be moved at a constant velocity;

storing in advance an acceleration-period power consumption value corresponding to a power consumption of the motor during the accelerating movement;

storing in advance a current value of a current flowing through the motor when the object to be moved is moved at the constant velocity;

detecting a time for which the object to be moved is moved at the constant velocity when the object to be moved is moved to the target position;

calculating a constant-velocity-period power consumption value corresponding to a power consumption of the motor during the constant velocity movement of the object to be moved based on the time that has been detected and the current value; and calculating a power consumption of the motor for a period during which the object to be moved is moved to the target position based on the acceleration-period power consumption value and the constant-velocity-period power consumption value.

With such a motor-controlling method, the amount of information to be stored can be kept small.

In the above-described motor-controlling method, it is preferable that the motor is a carry motor for carrying paper as the object to be moved. In the case of a carry motor, the driving range is large, so that it is particularly advantageous. The motor, however, may be a carriage motor for moving a carriage as the object to be moved.

In the above-described motor-controlling method, it is preferable that there are at least two drive modes for the motor, one of the drive modes being selected in accordance with the target position; and that the acceleration-period power consumption value is stored in advance for each of the drive modes. It is also preferable that an acceleration time is stored in advance for each of the drive modes; and that the time for which the object to be moved is moved at the constant velocity is detected based on the acceleration time. It is also preferable that an acceleration time is stored in advance for each of the drive modes; that a time required for moving the object to be moved to the target position is measured; and that the time for which the object to be moved is moved at the constant velocity is calculated by subtracting the acceleration time from the time that has been measured.

It is also preferable that the motor is driven through PWM control. It is also preferable that a temperature of the motor is estimated based on the power consumption for the period during which the object to be moved is moved to the target position. It is also preferable that a rest time of the motor is determined in accordance with the power consumption for the period during which the object to be moved is moved to the target position.

In the above-described motor-controlling method, it is also preferable that the power consumption of the motor for the period during which the object to be moved is moved to the target position is calculated based on print data. It is also preferable that the acceleration-period power consumption value is obtained based on the print data. It is also preferable that an acceleration time is obtained based on the print data; and that the constant-velocity-period power consumption value is obtained based on the acceleration time. It is also preferable that the acceleration-period power consumption value is stored in advance related to a length of a print area. It is also preferable that the acceleration-period power consumption value is obtained based on the length of the print area indicated in print data. It is also preferable that the power consumption of the motor for the period during which the object to be moved is moved to the target position is obtained in a different way depending on the print mode. It is also preferable that the acceleration-period power consumption value is a predetermined value when a photographic image is to be printed; and that, when a text image is to be printed, the acceleration-period power consumption value is obtained in accordance with a print area indicated in the print data. It is also preferable that the acceleration-period power consumption value is obtained in accordance with whether or not borderless printing is to be performed.

Further, a motor control device comprises:

a motor for moving an object to be moved, the motor being configured to move the object to be moved to a target position by first accelerating the object to be moved and then moving the object to be moved at a constant velocity;

a memory for storing in advance an acceleration-period power consumption value corresponding to a power consumption of the motor during the accelerating movement, and a current value of a current flowing through the motor when the object to be moved is moved at the constant velocity; and a controller configured to detect a time for which the object to be moved is moved at the constant velocity when the object to be moved is moved to the target position, calculate a constant-velocity-period power consumption value corresponding to a power consumption of the motor during the constant velocity movement of the object to be moved based on the time that has been detected and the current value, and calculate a power consumption of the motor for a period during which the object to be moved is moved to the target position based on the acceleration-period power consumption value and the constant-velocity-period power consumption value.

With such a motor control device, the amount of information to be stored can be kept small.

Configuration of Printing System

An embodiment of a printing system (computer system) is described below with reference to the drawings. However, the description of the following embodiment also includes implementations relating, for example, to computer programs and storage media on which the computer programs are recorded.

FIG. 1 is an explanatory diagram showing the external structure of the printing system. A printing system 100 is provided with a printer 1, a computer 110, a display device 120, an input device 130, and a record/play device 140. The printer 1 is a printing apparatus for printing images on a medium such as paper, cloth, or film. The computer 110 is electrically connected to the printer 1, and outputs print data corresponding to an image to be printed to the printer 1 in order to print the image with the printer 1. The display device 120 has a display, and displays user interfaces of, for example, an application program or a printer driver. The input device 130 is for example a keyboard 130A and a mouse 130B, and is used to operate an application program or adjust the settings of the printer driver, for example, in accordance with the user interface that is displayed on the display device 120. A flexible disk drive device 140A and a CD-ROM drive device 140B, for example, are employed as the record/play device 140.

A printer driver is installed on the computer 110. The printer driver is a program for achieving the function of displaying the user interface on the display device 120, and in addition it also achieves the function of converting image data that have been output from the application program into print data. The printer driver is stored on a storage medium (computer-readable storage medium) such as a flexible disk FD or a CD-ROM. The printer driver can also be downloaded onto the computer 110 via the Internet. It should be noted that this program is made of codes for achieving the various functions.

It should be noted that "printing apparatus" in a narrow sense means the printer 1, but in a broader sense it means the system constituted by the printer 1 and the computer 110.

Configuration of the Printer

<Regarding the Configuration of the Inkjet Printer>

Figure 2:
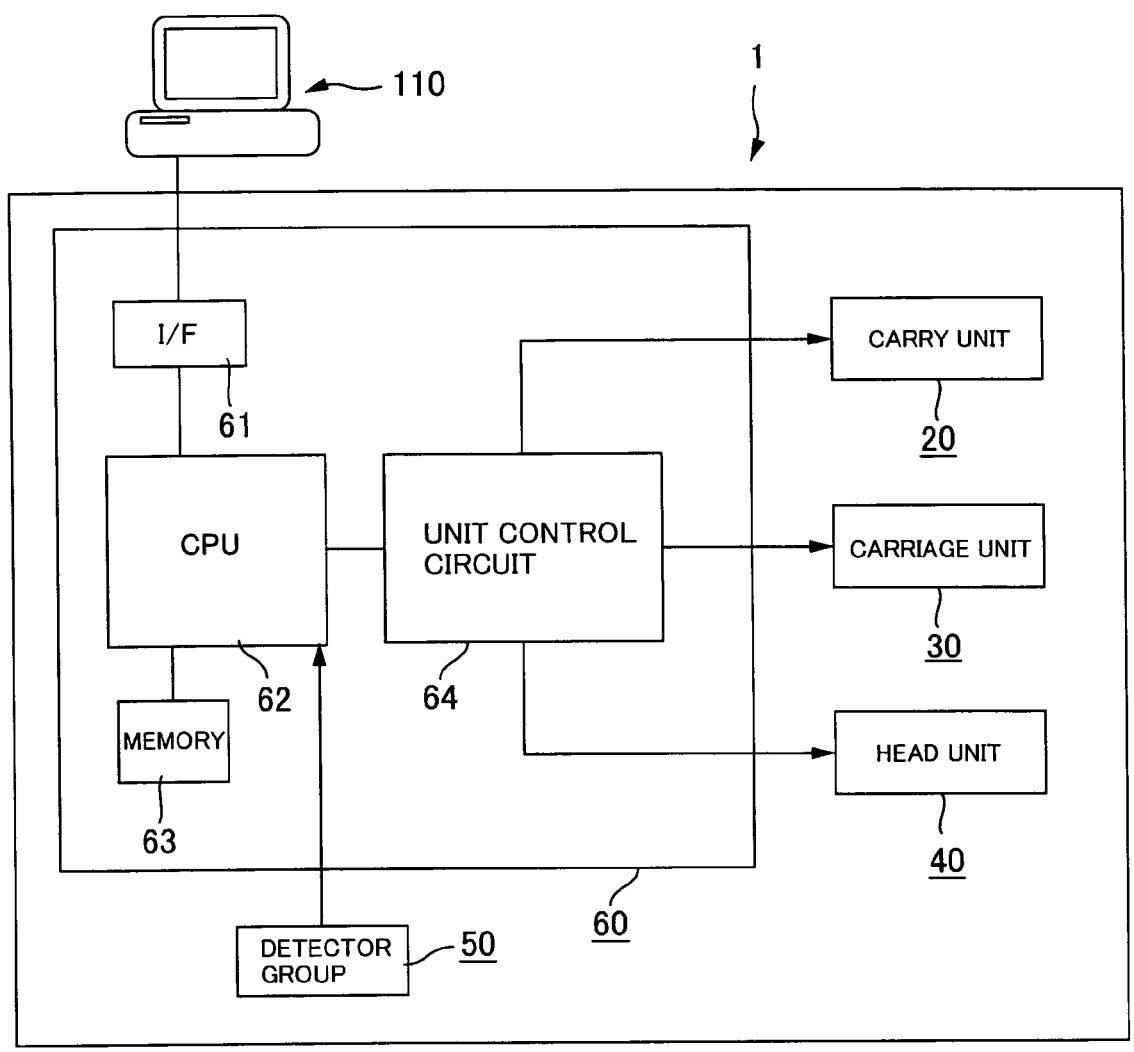
FIG. 2 is a block diagram of the overall configuration of a printer.
Figure 3:
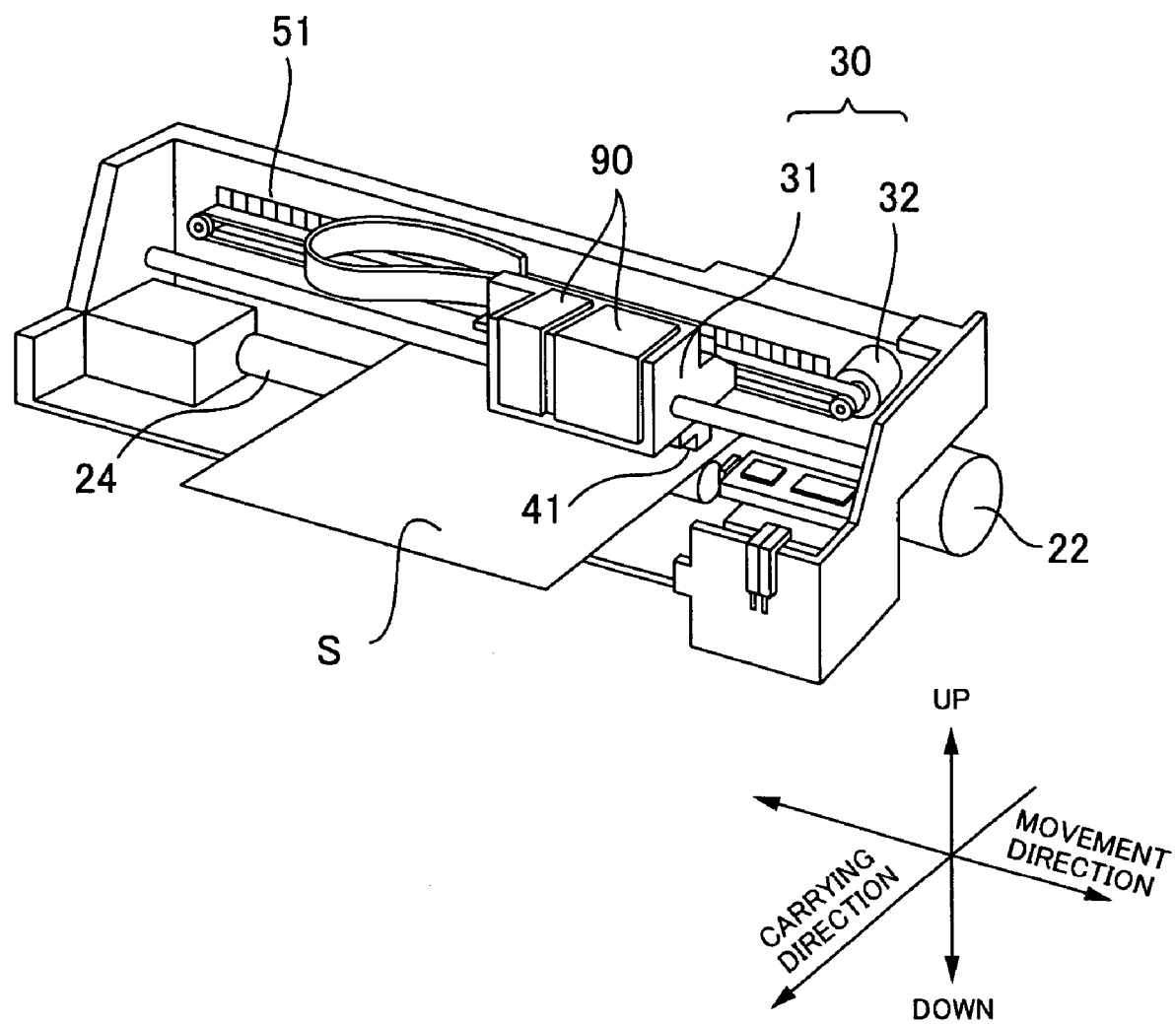
FIG. 3 is a schematic diagram of the overall configuration of the printer.
Figure 4:
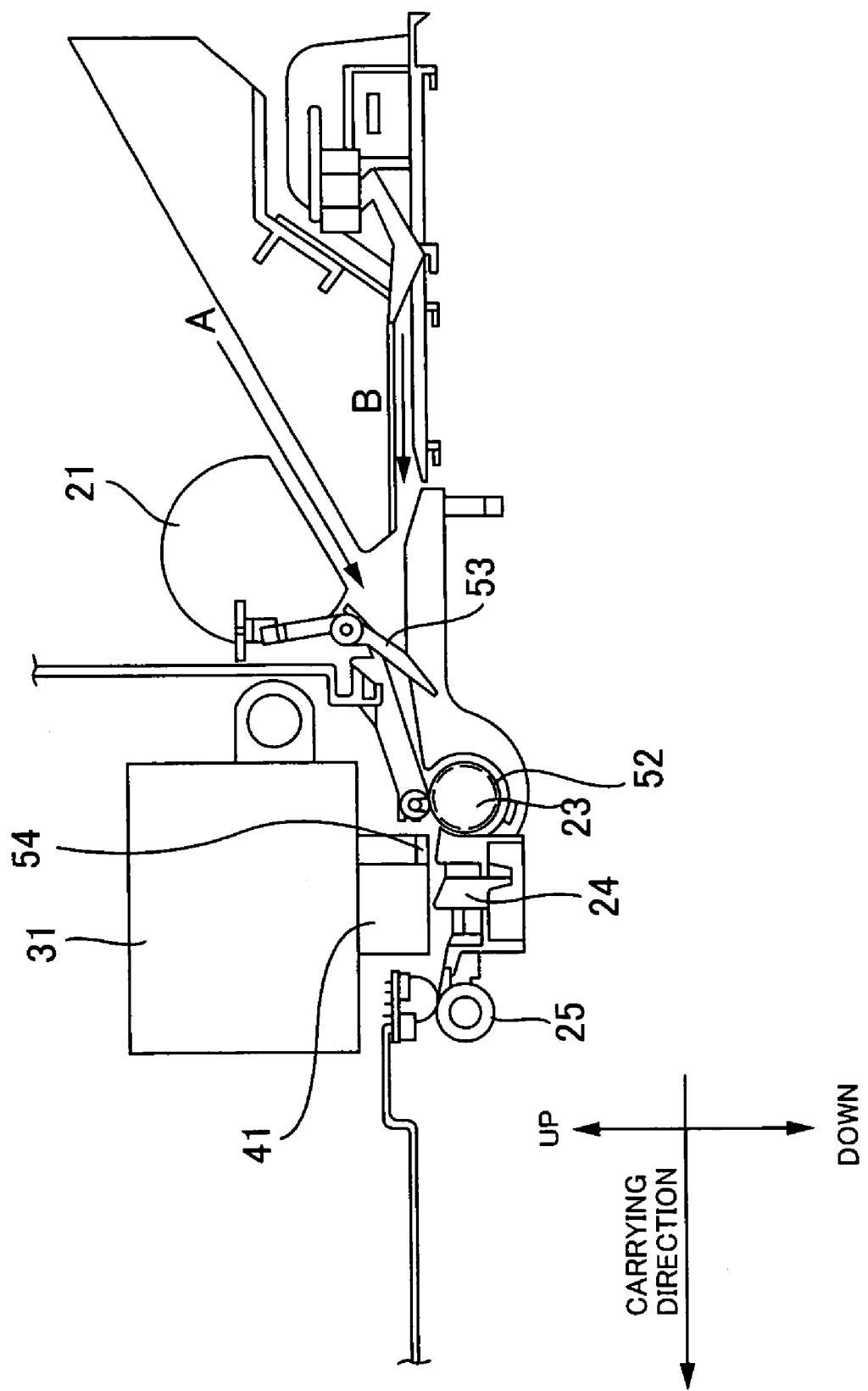
FIG. 4 is a vertical cross-section of the overall configuration of the printer.

FIG. 2 is a block diagram of the overall configuration of the printer of this embodiment. Further, FIG. 3 is a schematic diagram of the overall configuration of the printer of this embodiment. FIG. 4 is a transverse section view of the overall configuration of the printer of this embodiment. The basic structure of the printer of the present embodiment is described below.

The printer of this embodiment has a carry unit 20, a carriage unit 30, a head unit 40, a detector group 50, and a controller 60. The printer 1, which receives print data from the computer 110 which is an external device, controls the various units (the carry unit 20, the carriage unit 30, and the head unit 40) using the controller 60. The controller 60 controls the units in accordance with the print data that are received from the computer 110 to form an image on paper. The detector group 50 monitors the conditions inside the printer 1, and it outputs its detection results to the controller 60. The controller 60 receives the detection results from the detector group 50, and controls the units based on these detection results.

The carry unit 20 is for feeding a medium (for example, paper S) up to a printable position and carrying the paper in a predetermined direction (hereinafter, referred to as the carrying direction) by a predetermined carry amount during printing. In other words, the carry unit 20 functions as a carrying mechanism (carrying means) for carrying paper. The carry unit 20 has a paper supply roller 21, a carry motor (hereinafter, referred also to as "PF motor") 22, a carry roller 23, a platen 24, and a paper discharge roller 25. However, the carry unit 20 does not necessarily have to include all of these structural elements in order to function as a carrying mechanism. The paper supply roller 21 is a roller for automatically supplying paper that has been inserted into a paper insert opening into the printer. The paper supply roller 21 has a D-shaped cross-sectional shape, and the length of its circumference section is set longer than the carrying distance to the carry roller 23, so that using this circumference section it can carry the paper up to the carry roller 23. The carry motor 22 is a motor for carrying paper in the carrying direction, and is constituted by a DC motor. The carry roller 23 is a roller for carrying the paper S that has been supplied by the paper supply roller 21 up to a printable region, and is driven by the carry motor 22. The platen 24 supports the paper S during printing. The paper discharge roller 25 is a roller for discharging the paper S for which printing has finished to the outside of the printer. The paper discharge roller 25 is rotated in synchronization with the carry roller 23.

The carriage unit 30 is for moving (also referred to as "scanning") the head in a predetermined direction (hereinafter, this is referred to as the "movement direction"). The carriage unit 30 has a carriage 31 and a carriage motor (also referred to as "CR motor") 32. The carriage 31 can be moved back and forth in the movement direction (thus, the head is moved in the movement direction). Further, the carriage 31 detachably retains an ink cartridge containing ink. The carriage motor 32 is a DC motor for moving the carriage 31 in the movement direction.

The head unit 40 is for ejecting ink onto paper. The head unit 40 has a head 41. The head 41 has a plurality of nozzles, which are ink ejection sections, and ejects ink intermittently from the nozzles. The head 41 is provided on the carriage 31. Thus, when the carriage 31 moves in the movement direction, the head 41 also moves in the movement direction. A line made of dots (raster line) is formed on the paper in the movement direction as a result of the head 41 intermittently ejecting ink while moving in the movement direction.

The detector group 50 includes a linear encoder 51, a rotary encoder 52, a paper detection sensor 53, and an optical sensor 54, for example. The linear encoder 51 is for detecting the position of the carriage 31 in the movement direction. The rotary encoder 52 is for detecting the amount of rotation of the carry roller 23. The paper detection sensor 53 is for detecting the position of the front end of the paper to be printed. The paper detection sensor 53 is provided at a position where it can detect the position of the front end of the paper as the paper is being fed toward the carry roller 23 by the paper supply roller 21. It should be noted that the paper detection sensor 53 is a mechanical sensor that detects the front end of the paper through a mechanical mechanism. More specifically, the paper detection sensor 53 has a lever that can be rotated in the carrying direction, and this lever is disposed such that it sticks out into the path over which the paper is carried. In this way, the front end of the paper comes into contact with the lever and the lever is rotated, and thus the paper detection sensor 53 detects the position of the front end of the paper by detecting the movement of the lever. The optical sensor 54 is attached to the carriage 31. The optical sensor 54 detects whether or not the paper is present by detecting, with its light-receiving section, the light that is irradiated from its light-emitting section onto the paper and reflected therefrom. The optical sensor 54 detects the position of the edges of the paper while being moved by the carriage 31. The optical sensor 54 detects the edges of the paper optically, and thus has higher detection precision than the mechanical paper detection sensor 53.

The controller 60 is a control unit (control means) for carrying out control of the printer. The controller 60 has an interface section 61, a CPU 62, a memory 63, and a unit control circuit 64. The interface section 61 is for exchanging data between the computer 110, which is an external device, and the printer 1. The CPU 62 is a computation processing device for performing the overall control of the printer. The memory 63 is for securing a work area and an area for storing the programs of the CPU 62, for instance, and includes memory means such as a RAM or an EEPROM. The CPU 62 controls the various units via the unit control circuit 64 in accordance with programs stored on the memory 63.

<Regarding the Printing Operation>

Figure 5:
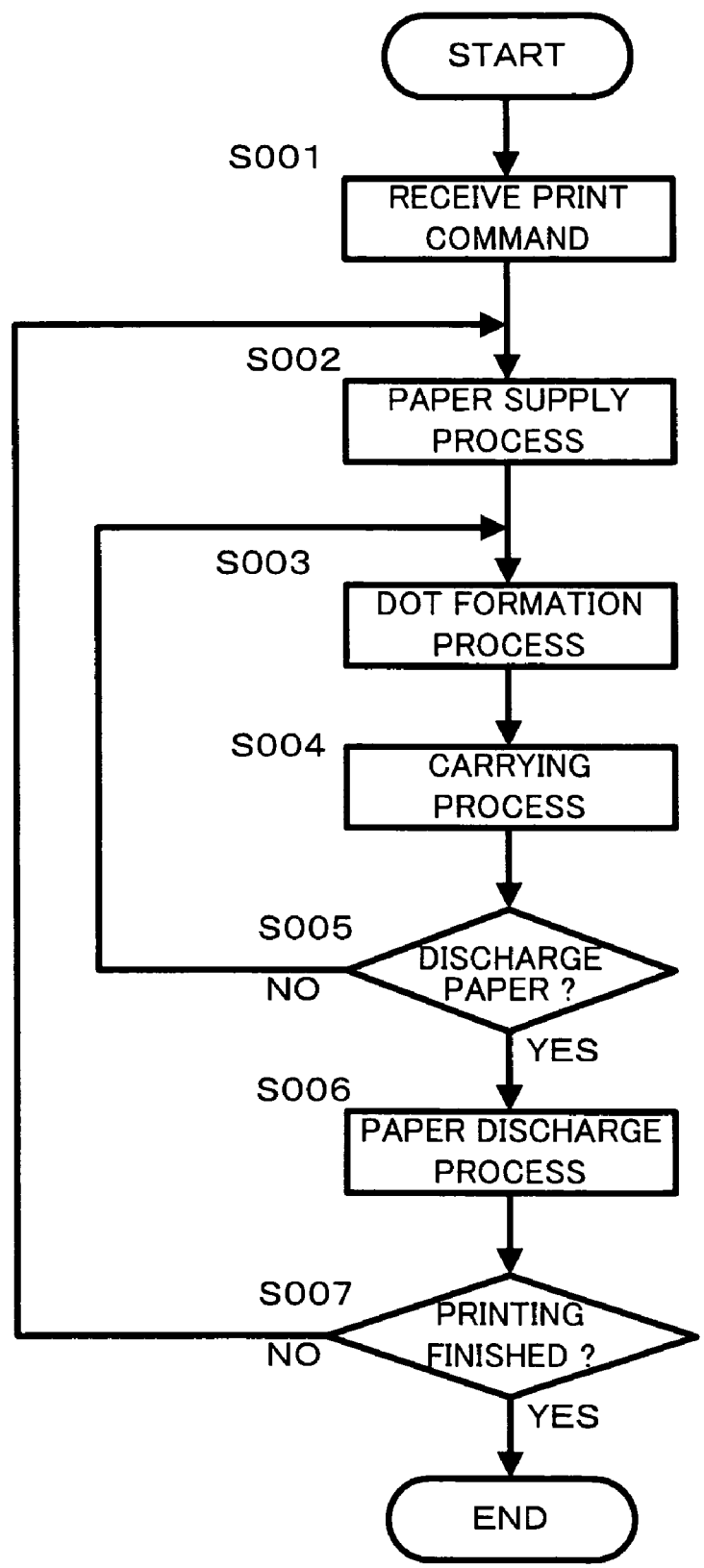
FIG. 5 is a flowchart of the processing during printing.

FIG. 5 is a flowchart of the processing during printing. The processes described below are executed by the controller 60 controlling the various units in accordance with a program stored in the memory 63. This program has codes for executing the various processes.

Receive Print Command (S001): First, the controller 60 receives a print command from the computer 110 via the interface section 61. This print command is included in the header of the print data transmitted from the computer 110. The controller 60 then analyzes the content of the various commands included in the print data that are received and uses the units to perform the following paper supply process, carrying process, and ink ejection process, for example.

Paper Supply Process (S002): The paper supply process is a process for supplying paper to be printed into the printer and positioning the paper at a print start position (also referred to as the "indexed position"). The controller 60 rotates the paper supply roller 21 to feed the paper to be printed up to the carry roller 23. The controller 60 rotates the carry roller 23 to position the paper that has been fed from the paper supply roller 21 at the print start position. When the paper has been positioned at the print start position, at least some of the nozzles of the head 41 are in opposition to the paper.

Dot Formation Process (S003): The dot formation process is a process for intermittently ejecting ink from a head that moves in the movement direction so as to form dots on the paper. The controller 60 drives the carriage motor 32 to move the carriage 31 in the movement direction. The controller 60 then causes the head to eject ink in accordance with the print data while the carriage 31 is moving. Dots are formed on the paper when ink droplets ejected from the head land on the paper. Since ink is intermittently ejected from the moving head, dot rows made of a plurality of dots in the movement direction are formed on the paper.

Carrying Process (S004): The carrying process is a process for moving the paper relative to the head in the carrying direction. The controller 60 drives the carry motor to rotate the carry roller and thereby carry the paper in the carrying direction. Due to the carrying process, the head 41 can form dots at positions that are different from the positions of the dots formed in the preceding dot formation process.

Paper Discharge Determination (S005): The controller 60 determines whether or not to discharge the paper being printed. The paper is not discharged if there still is data to be printed onto the paper being printed. The controller 60 alternately repeats the dot formation and carrying processes until there are no longer data to be printed, gradually printing an image made of dots on the paper.

Paper Discharge Process (S006): When there is no longer data to be printed on the paper being printed, the controller 60 discharges that paper by rotating the paper discharge roller. It should be noted that whether or not to discharge the paper can also be determined based on a paper discharge command included in the print data.

Print Ending Determination (S007): Next, the controller 60 determines whether or not to continue printing. If a next sheet of paper is to be printed, then printing is continued and the process of supplying the next sheet of paper is started. If a next sheet of paper is not to be printed, then the printing operation is ended.

Carrying Process

<Regarding the Carrying Process>

Figure 6:
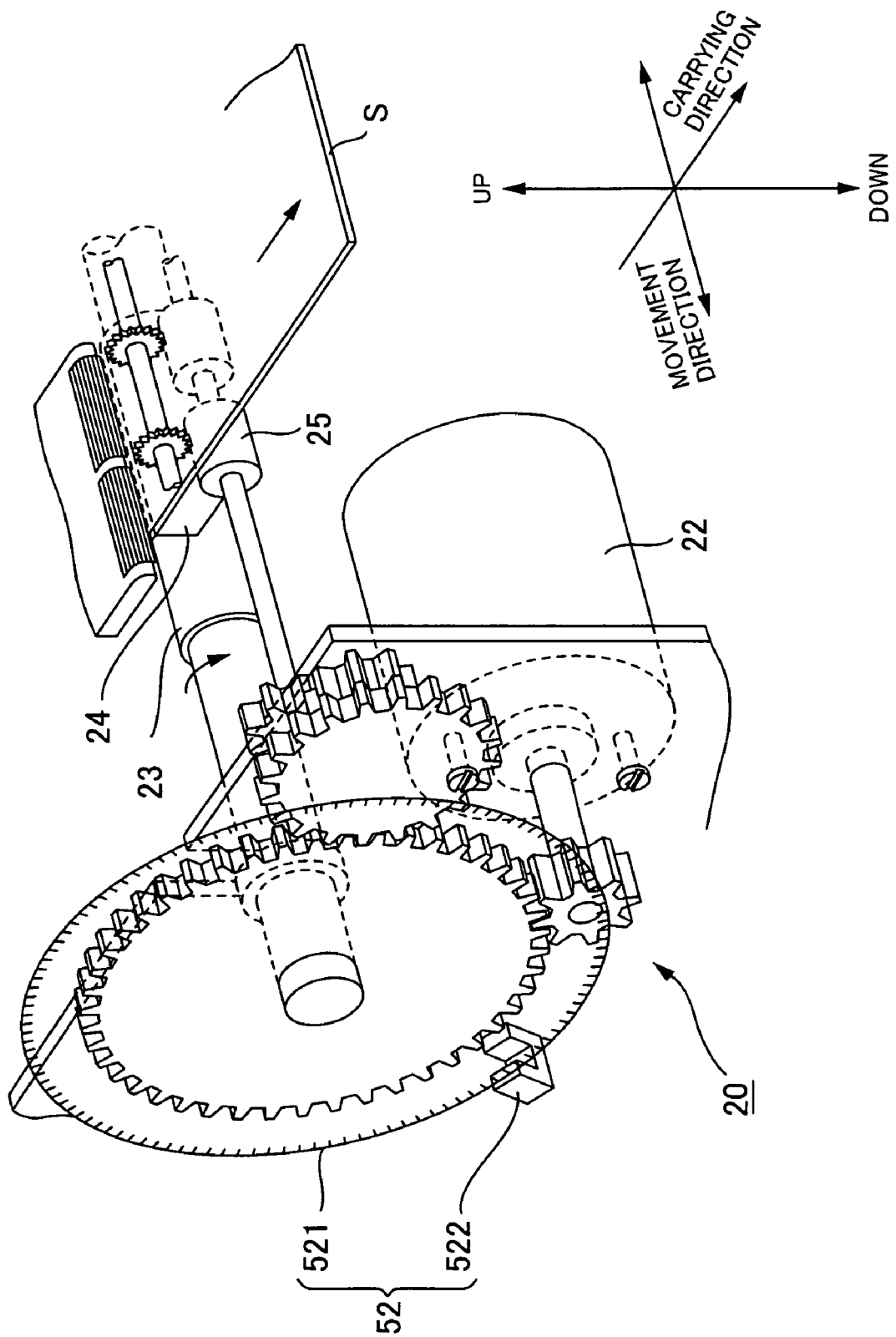
FIG. 6 is an explanatory diagram of the structure of a carry unit.

FIG. 6 is an explanatory diagram of the structure of the carry unit 20. It should be noted that in this diagram, structural elements that have already been described are assigned identical reference numerals and thus description thereof is omitted.

The carry unit 20 drives the carry motor 22 by a predetermined drive amount in accordance with a carry command from the controller. The carry motor 22 generates a drive force in the rotation direction that corresponds to the drive amount that has been ordered. The carry motor 22 then rotates the carry roller 23 using this drive force. The carry motor 22 also uses this drive force to rotate the paper discharge roller 25. That is, when the carry motor 22 generates a predetermined drive amount, the carry roller 23 and the paper discharge roller 25 rotate by a predetermined rotation amount. When the carry roller 23 and the paper discharge roller 25 are rotated by the predetermined rotation amount, the paper is carried by a predetermined carry amount. Because the carry roller 23 and the paper discharge roller 25 rotate in synchronization with one another, the paper can be carried by the carry unit 20 as long as it is in contact with at least one of the carry roller 23 and the paper discharge roller 25.

The amount by which the paper is carried is determined according to the rotation amount of the carry roller 23. Consequently, if the rotation amount of the carry roller 23 can be detected, then it is also possible to detect the carry amount of the paper. The rotary encoder 52 is thus provided to detect the rotation amount of the carry roller 23.

<Regarding the Structure of the Rotary Encoder>

Figure 7:
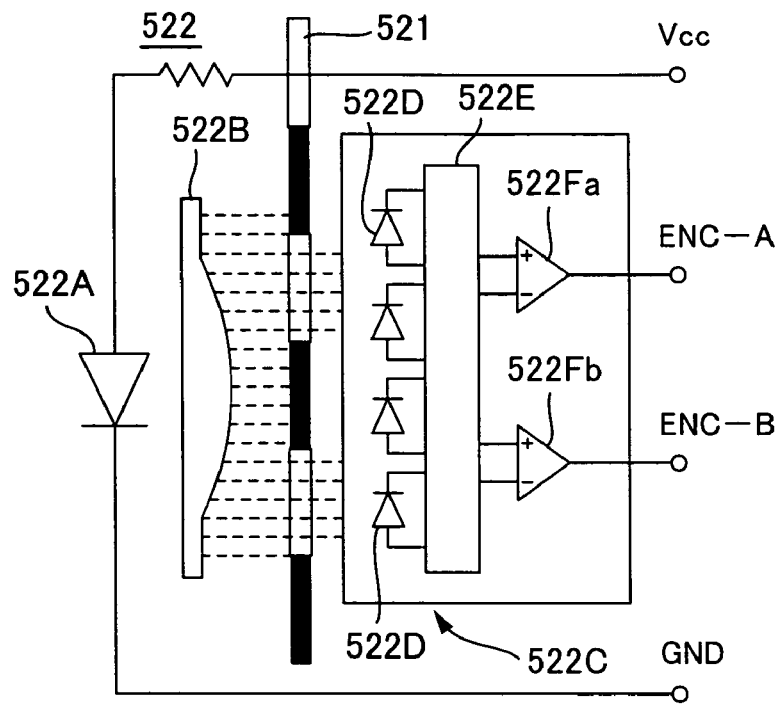
FIG. 7 is an explanatory diagram of the structure of a rotary encoder.

FIG. 7 is an explanatory diagram of the structure of the rotary encoder. It should be noted that in this diagram, structural elements that have already been described are assigned identical reference numerals and thus description thereof is omitted.

The rotary encoder 52 has a scale 521 and a detection section 522.

The scale 521 has numerous slits provided at a predetermined pitch. The scale 521 is provided on the carry roller 23. That is, the scale 521 rotates together with the carry roller 23. For example, when the carry roller 23 is rotated such that the paper S is carried by $1/1440$ inch, the scale 521 is rotated by one slit with respect to the detection section 522.

The detection section 522 is provided in opposition to the scale 521, and is fastened to the main printer unit side. The detection section 522 has a light-emitting diode 522A, a collimating lens 522B, and a detection processing section 522C. The detection processing section 522C is provided with a plurality of (for instance, four) photodiodes 522D, a signal processing circuit 522E, and two comparators 522Fa and 522Fb.

The light-emitting diode 522A emits light when a voltage Vcc is applied to it via resistors on both sides, and this light is incident on the collimating lens. The collimating lens 522B turns the light that is emitted from the light-emitting diode 522A into parallel light, and irradiates the parallel light on the scale 521. The parallel light that passes through the slits provided in the scale then passes through stationary slits (not shown) and is incident on the photodiodes 522D.

The photodiodes 522D convert the incident light into electric signals. The electric signals that are output from the photodiodes are compared in the comparators 522Fa and 522Fb, and the results of these comparisons are output as pulses. The pulse ENC-A and the pulse ENC-B that are output from the comparators 522Fa and 522Fb become the output of the rotary encoder 52.

<Regarding the Signals of the Rotary Encoder>

Figure 8A:
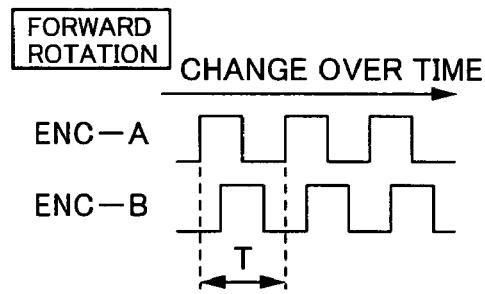
FIG. 8A is a timing chart of the waveform of an output signal during forward rotation.
Figure 8B:
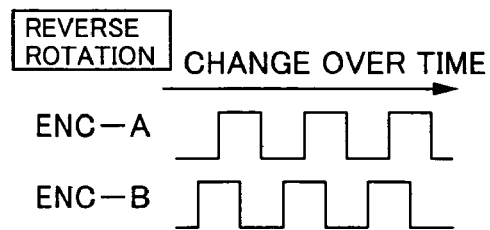
FIG. 8B is a timing chart of the waveform of an output signal during reverse rotation.

FIG. 8A is a timing chart of the waveforms of the output signals when the carry motor 22 is rotating forward. FIG. 8B is a timing chart of the waveforms of the output signals when the carry motor 22 is rotating in reverse.

As shown in these figures, the phases of the pulse ENC-A and the pulse ENC-B are misaligned by 90 degrees both when the carry motor 22 is rotating forward and when it is rotating in reverse. When the carry motor 22 is rotating forward, that is, when the paper S is being carried in the carrying direction, then the phase of the pulse ENC-A leads the phase of the pulse ENC-B by 90 degrees. On the other hand, when the carry motor 22 is rotating in reverse, that is, when the paper S is being carried in the direction opposite the carrying direction, then the phase of the pulse ENC-A trails the phase of the pulse ENC-B by 90 degrees. A single period T of the pulses is the same as the time during which the carry roller 23 is rotated by the interval between slits of the scale 521 (for example, by 1/1440 inch (1 inch equals 2.54 cm)).

The rotation amount of the carry roller 23 can be detected if the controller counts the number of pulse signals, and therefore, the carry amount of the paper can be detected. Further, the rotation velocity of the carry roller 23 can be detected by the controller detecting a single period T of the pulses, and therefore, the speed at which the paper is carried can be detected.

Carry Unit Control Circuit

<Regarding the Configuration of the Carry Unit Control Circuit>

Figure 9:
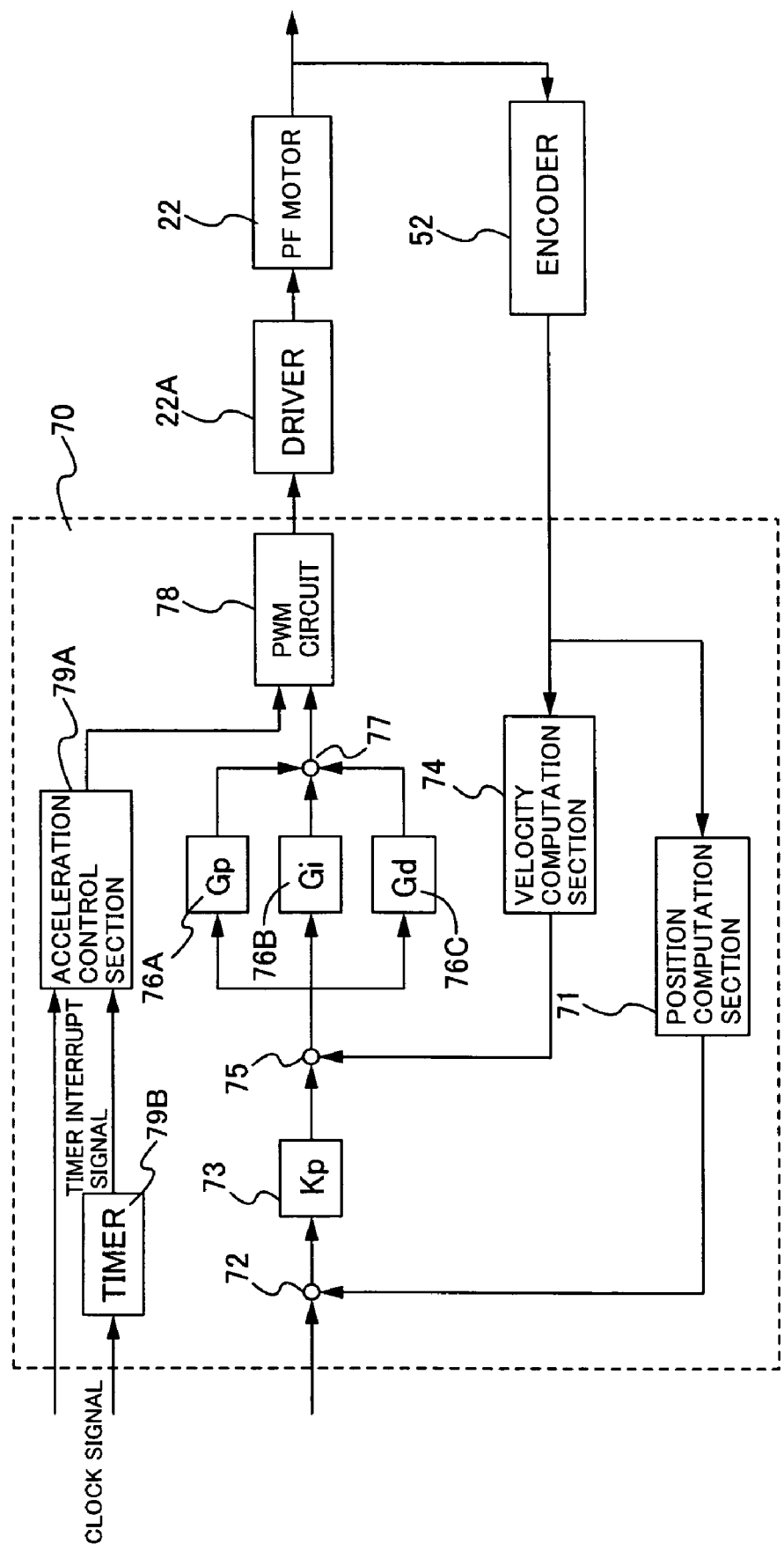
FIG. 9 is a block diagram of a carry unit control circuit.

FIG. 9 is a block diagram showing the configuration of a carry unit control circuit 70. The carry unit control circuit 70 controls the driving of the carry motor 22 of the carry unit 20, and is provided in the unit control circuit 64 mentioned above. The carry unit control circuit controls the carry motor, so it is also a carry motor control device.

The carry unit control circuit 70 has a position computation section 71, a subtractor 72, a gain 73, a velocity computation section 74, a subtractor 75, a proportional element 76A, an integral element 76B, a derivative element 76C, an adder 77, a PWM circuit 78, an acceleration control section 79A, and a timer 79B.

The position computation section 71 detects the edges of the output pulses of the rotary encoder 52, counts the number of edges, and computes the rotation position of the carry motor 22 based on that count number. The position computation section 71 compares the two pulsed signals and from this comparison, recognizes whether the carry motor 22 is rotating forward or in reverse, and performs a counting process of incrementing or decrementing when a single edge is detected depending on whether the carry motor 22 is rotating forward or in reverse.

The subtractor 72 computes the positional deviation between the target position sent from the CPU 62 and the detection position that has been detected by the position computation section 71. The gain 73 multiplies the positional deviation that is output from the subtractor 72 by again Kp, and outputs the target velocity. The gain Kp is determined according to the positional deviation. It should be noted that a table indicating the relationship between the value of the gain Kp and the positional deviation is stored on the memory 63.

The velocity computation section 74 computes the rotation velocity of the carry motor 22 based on the output pulses of the rotary encoder 52. That is, the velocity computation section 74 measures the length of the pulse period of the output pulses of the linear encoder 52 and computes the rotation velocity of the carry motor 22 from this pulse period.

The subtractor 75 computes the velocity deviation between the target velocity that has been output from the gain 73 and the detection velocity that has been detected by the velocity computation section 74.

The proportional element 76A multiplies the velocity deviation by a constant Gp, and outputs this as the proportional component. The integral element 76B integrates the values obtained by multiplying the velocity deviation by a constant Gi, and outputs this as the integral component. The derivative element 76C multiplies the difference between the current velocity deviation and the immediately prior velocity deviation by a constant Gd, and outputs this as the derivative component. The computations of the proportional element 76A, the integral element 76B, and the derivative element 76C are performed per each period of the output pulse of the rotary encoder 52.

The signal values output from the proportional element 76A, the integral element 76B, and the derivative element 76C indicate a duty DX that corresponds to the respective computation results. Here, the duty DX for example indicates that the duty percentage is (100×DX/2000)%. In this case, it indicates a duty of 100% if DX=2000 and a duty of 50% if DX=1000.

The adder 77 sums up the output of the proportional element 76A, the output of the integral element 76B, and the output of the derivative element 76C. It sends the result of this addition to the PWM circuit 78 as a duty signal. The PWM circuit 78 generates a command signal that corresponds to the results of the addition by the adder 77. A driver 22A drives the carry motor 22 based on this command signal.

The driver 22A is provided with a plurality of transistors, for example, and it applies a voltage to the carry motor 22 by turning these transistors on and off in accordance with the command signal from the PWM circuit 78.

The acceleration control section 79A and the timer 79B are used during acceleration control of the carry motor 22. The timer 79B generates a timer interrupt signal at predetermined time intervals based on clock signals received from the CPU 62. The acceleration control section 79A integrates a predetermined duty DXP every time it receives a timer interrupt signal, and outputs a duty signal to the PWM circuit 78 as the results of this integration.

When driving the carry motor 22 such that it accelerates, the PWM circuit 78 outputs a command signal to the carry motor 22 based on the duty signal that is output from the acceleration control section 79A, thus controlling the carry motor 22. When driving the carry motor 22 at a constant velocity or when decelerating the carry motor 22, the PWM circuit 78 outputs a control signal to the carry motor 22 based on the duty signal that is output from the adder 77, in order to perform PID control of the carry motor 22.

<Regarding the Driving of the Carry Motor>

Figure 10A:
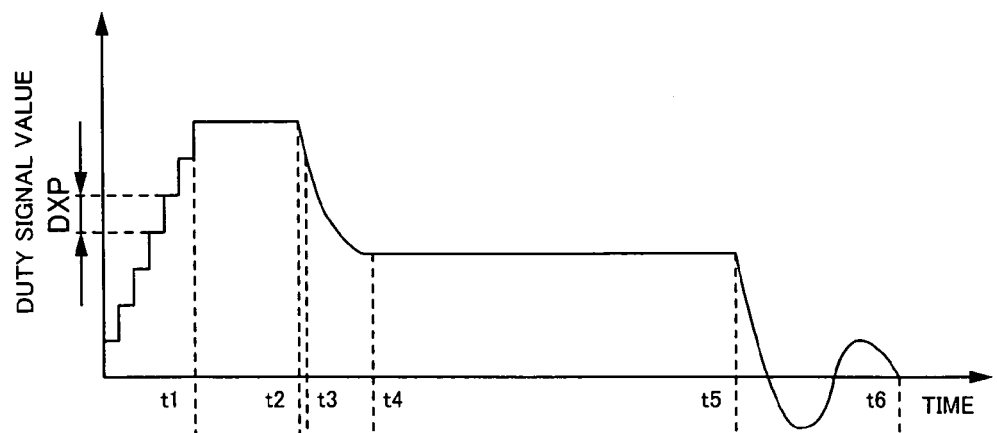
FIG. 10A is a graph plotting the change over time of the duty signal that is input to the PWM circuit.
Figure 10B:
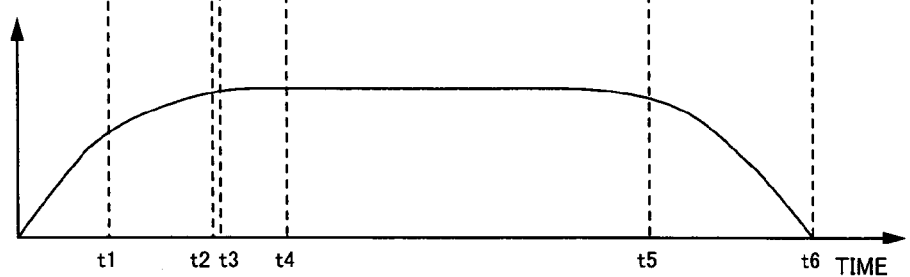
FIG. 10B is a graph plotting the change in velocity of the motor.

FIG. 10A is a graph plotting the change over time of the duty signal that is input to the PWM circuit 78. FIG. 10B is a graph plotting the change in velocity of the motor. Referring to these figures, the following is an explanation of the driving of the carry motor.

When the carry motor 22 is halted and an activation command signal for activating the carry motor 22 is sent from the CPU 62 to the carry unit control circuit 70, an activation initial duty signal whose signal value is DX0 is sent from the acceleration control section 79A to the PWM circuit 78. The activation initial duty signal is sent from the CPU 62 to the acceleration control section 79A together with the activation command signal. The activation initial duty signal is then converted into a command signal that corresponds to the signal value DX0 by the PWM circuit 78, and activation of the carry motor 22 is started.

After the carry unit control circuit 70 has received the activation command signal, a timer interrupt signal is generated by the timer 79B at predetermined time intervals. Each time the acceleration control section 79A receives a timer interrupt signal, it adds a predetermined duty DXP to the signal value DX0 of the activation initial duty signal and sends a duty signal whose signal value is this integrated duty to the PWM circuit 78. This duty signal is converted into a command signal corresponding to its signal value by the PWM circuit 78, and the rotation velocity of the carry motor 22 increases. Thus, the value of the duty signal sent to the PWM circuit 78 from the acceleration control circuit 79A rises in a stepwise manner.

The duty integration process of the acceleration control section 79A is performed until the integrated duty becomes a predetermined duty DXS. When the integrated duty becomes the predetermined value DXS at the time t1, the acceleration control section 79A stops integration and thereafter sends a duty signal whose signal value is a constant duty DXS to the PWM circuit 78.

Then, when the carry motor 22 reaches a predetermined rotation velocity (see time t2), the acceleration control section 79A performs control to reduce the duty signal that is output to the PWM circuit 78 and thereby reduce the duty percentage of the voltage that is applied to the carry motor 22. At this time, the rotation velocity of the carry motor 22 still increases further. Then, at the time t3, the PWM circuit 78 selects the output of the adder 77 and performs PID control. At the point that PID control is started (t3), the integrated value of the integral element 76B is set to an appropriate value, and the value output by the integral element 76B becomes a predetermined value.

When PID control is started, the carry unit control circuit 70 multiplies the gain Kp to the positional deviation between the target rotation position and the actual rotation position obtained from the output of the rotary encoder 52 to calculate the target rotation velocity. The carry unit control circuit 70 uses the proportional element 76A, the integral element 76B, and the derivative element 76C to compute the proportional component, the integrated component, and the derivative component based on the velocity deviation between this target rotation velocity and the actual rotation velocity obtained from the output of the rotary encoder 52, and performs control of the carry motor 22 based on the sum of these computation results. It should be noted that the proportional, integral, and derivative computations are performed in synchronization with the rising edge of the output pulse ENC-A of the rotary encoder 52, for example. Thus, the rotation velocity of the carry motor 22 is controlled so that it is a desired velocity at the time t4.

When the carry motor 22 approaches the target rotation position (time t5), the positional deviation becomes smaller and thus the target rotation velocity also becomes smaller. Thus, the velocity deviation, that is, the output of the subtractor 75, becomes negative, and the carry motor 22 decelerates and stops at the time t6.

Figure 11:
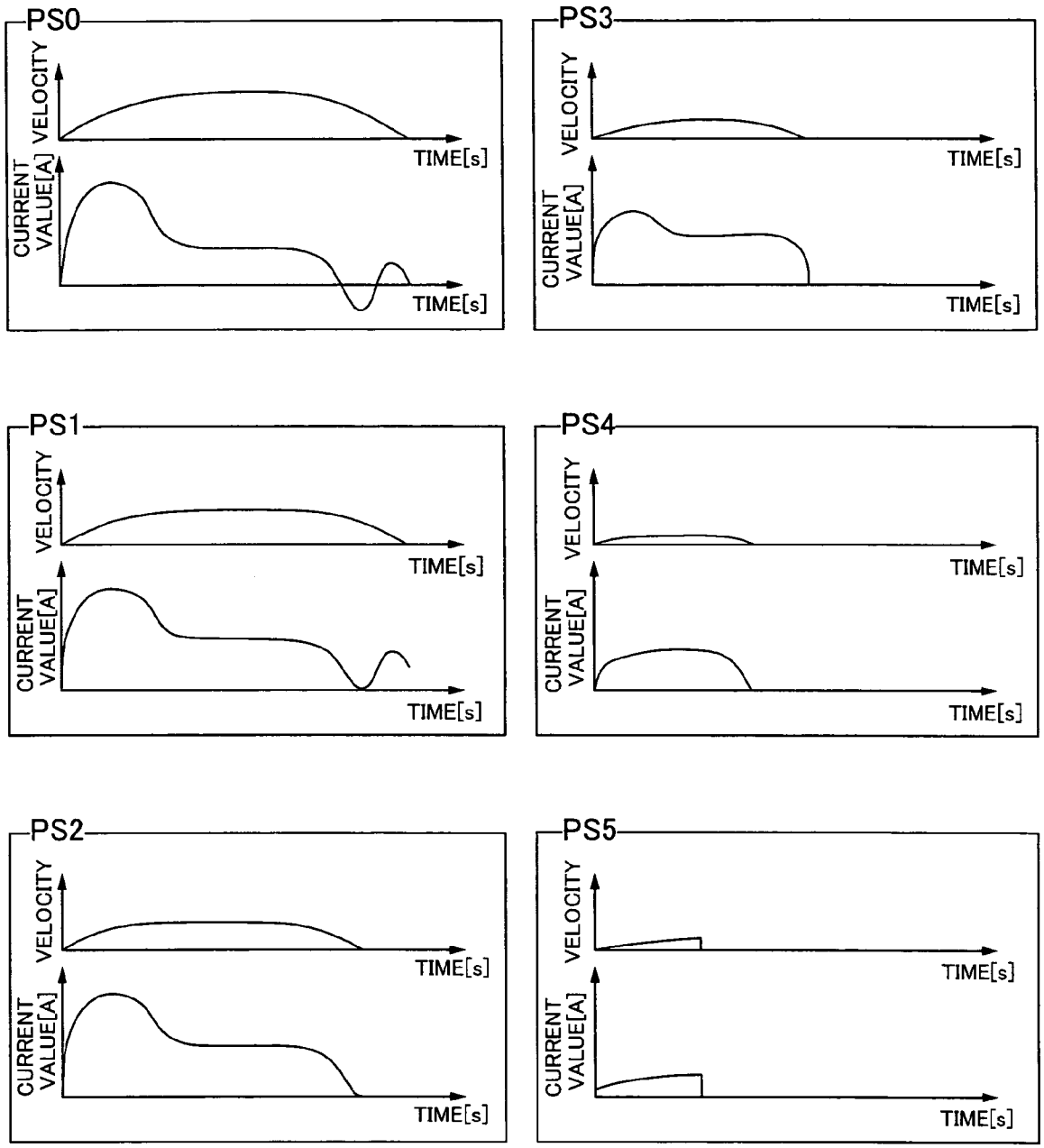
FIG. 11 shows diagrams illustrating the carry modes.

FIG. 11 shows a diagram illustrating the carry modes. In the present embodiment, the controller 60 controls the carry motor 22 with six carry modes (PS0 to PS5). A carry mode table correlating the carry modes with carry amounts (target rotation positions) is stored in advance in the memory 63. Based on this carry mode table, the controller 60 selects the carry mode corresponding to the carry amount. It should be noted that the carry mode PS0 is selected when the carry amount is large, and the carry mode PS5 is selected when the carry amount is small.

Outline of the Present Embodiment

The controller 60 calculates the carry motor's heat generation amount Q1 per carrying process, calculates the carry motor's cumulative heat amount Qs from the sum of these heat generation amounts Q1, and performs heat generation restriction control with respect to the carry motor in accordance with the cumulative heat amount Qs.

The heat generation amount of the carry motor is calculated by adding the acceleration-period heat generation amount Qbase, which is the amount of heat generated during the acceleration of the carry motor, and the constant-velocity-period heat generation amount Qc, which is the amount of heat generated while the carry motor operates at constant velocity.

A table correlating acceleration-period heat generation amounts Qbase and carry amounts (target rotation positions) is stored in advance in the memory 63. If the target rotation position is known, the controller 60 can determine the acceleration-period heat generation amount Qbase from the table (this is explained later in the section "Acceleration-Period Heat Generation Amount Table").

The constant-velocity-period heat generation amount Qc can be calculated from the current Ifuka flowing through the carry motor during constant velocity and the time tc for which the carry motor rotates at constant velocity. The current Ifuka that flows through the carry motor during constant velocity differs depending on the load of the carry motor, and thus is measured when the power is turned ON (this is discussed later in the section "Load Measurement"). The time tc for which the carry motor rotates at constant velocity is measured when printing is actually performed.

The heat generation amount Q1 of the carry motor per carry is calculated by adding the acceleration-period heat generation amount Qbase and the constant-velocity-period heat generation amount Qc. The controller 60 calculates the heat generation amount Q1 for each carrying process, and estimates the temperature of the carry motor in consideration of the natural heat dissipation from the carry motor (this is discussed later in the section "Temperature Estimation Process").

Heat generation restriction control is started when the estimated temperature of the carry motor reaches a threshold value. The carry motor 22 and the carriage motor are driven in alternation, so that in heat generation restriction control, a rest period is inserted between the intermittent drives of the carry motor to allow heat to be radiated from the carry motor (this is discussed later in the section "Heat Generation Restriction Control").

Acceleration-Period Heat Generation Amount Table

The amount of heat generated is generally found with the following formula.

$Q = K \cdot W$ (where $K$ is a coefficient for converting a given work W into heat)

Here, $W = I^2 \cdot R \cdot t$. Thus, $Q = I^2 \cdot R \cdot t \cdot K$. Considering the heat generation due to operation of the carry motor 22, R is the resistance of the coil of the carry motor and is a constant. R and K are constants so that the relation $Q \propto I^2 \cdot t$ is given. Accordingly, in the following description, $I^2 \cdot t$ is referred to as the heat generation amount (actually, it is a value proportional to the heat generation amount).

Figures 12, 13:
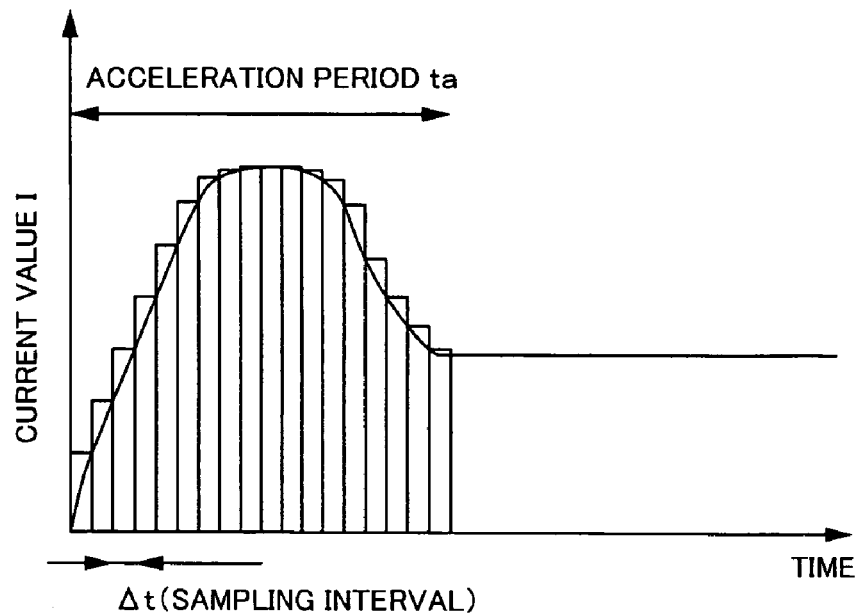
FIG. 12 is an explanatory diagram of a method of measuring the acceleration-period heat generation amount Qbase.
FIG. 13 shows an acceleration-period heat generation amount table that is created.

FIG. 12 is an explanatory diagram of a method for measuring the acceleration-period heat generation amount Qbase.

First, the carry motor is driven at the same carry mode as when printing is actually performed. Next, the current value I of the current flowing through the carry motor is consecutively measured at brief time intervals $\Delta t$. Next, the measured current value I is squared and multiplied by the brief time $\Delta t$ to obtain the value $I^2 \cdot t$, and this value is successively summed up. The result of this integration corresponds to the acceleration-period heat generation amount Qbase for that carry mode.

This measurement is performed for every carry mode. The acceleration-period heat generation amount table correlating the carry modes and the acceleration-period heat generation amounts Qbase is thus created.

FIG. 13 shows the resulting acceleration-period heat generation amount table. Creation of the acceleration-period heat generation amount table is performed in the factory where the printer is manufactured. The resulting acceleration-period heat generation amount table is then stored in the memory 63, and with this acceleration-period heat generation amount table stored in the memory 63, the printer is shipped from the factory. It should be noted that the acceleration-period heat generation amount table of the present embodiment also includes information regarding the carry modes, and also serves as the above-mentioned carry mode table. The acceleration-period heat generation amount table further includes information on the acceleration period (acceleration time). How this information on the acceleration period is used is explained later.

Load Measurement

The current value that is necessary to drive the carry motor at a constant velocity differs depending on the load on the carry motor. Accordingly, before performing the print processing, such as when the power is turned ON, the printer performs a load measurement as described below to measure the current value Ifuka for driving the carry motor at a constant velocity V1.

Figure 14:
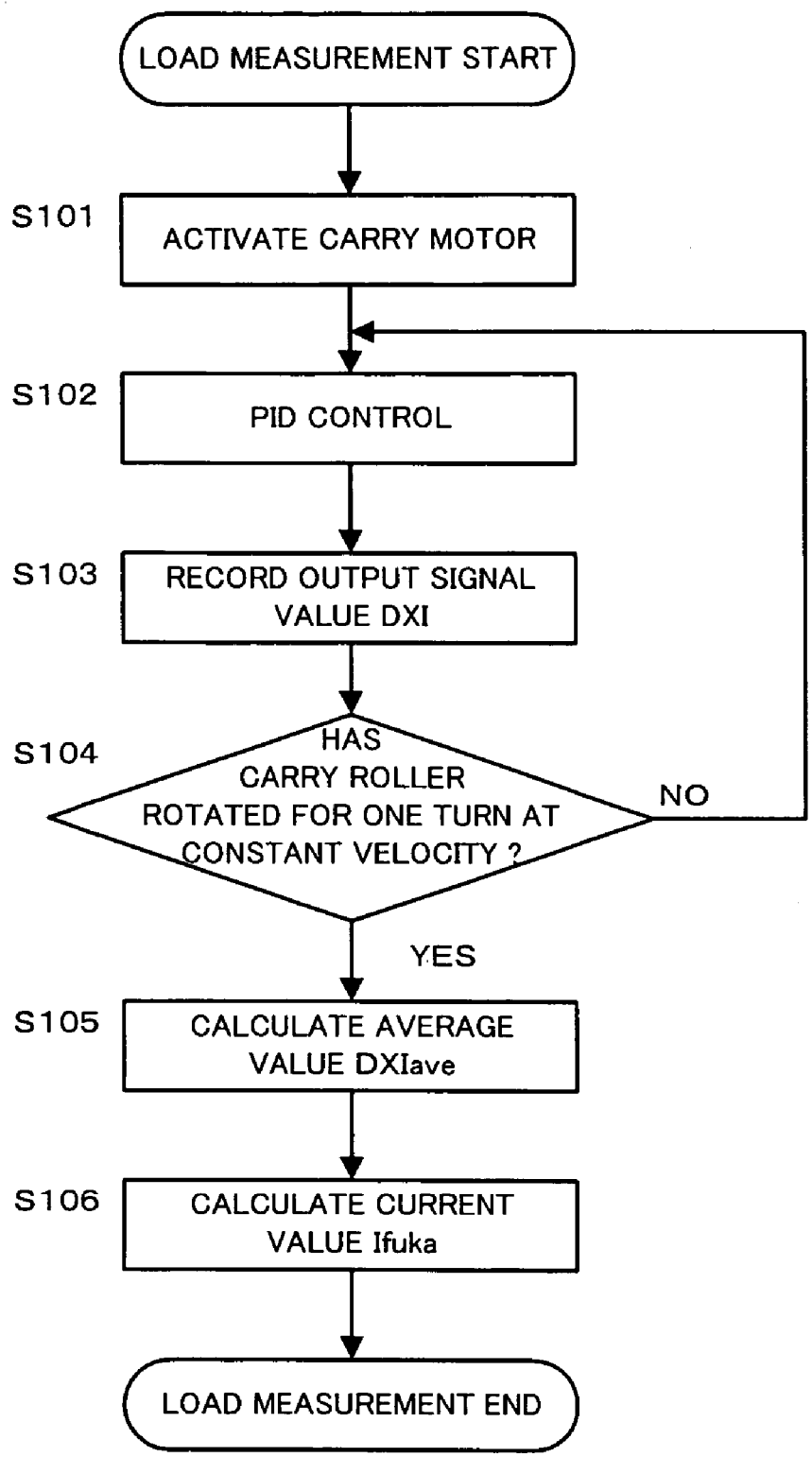
FIG. 14 is a flowchart of a load measurement process.
Figure 15:
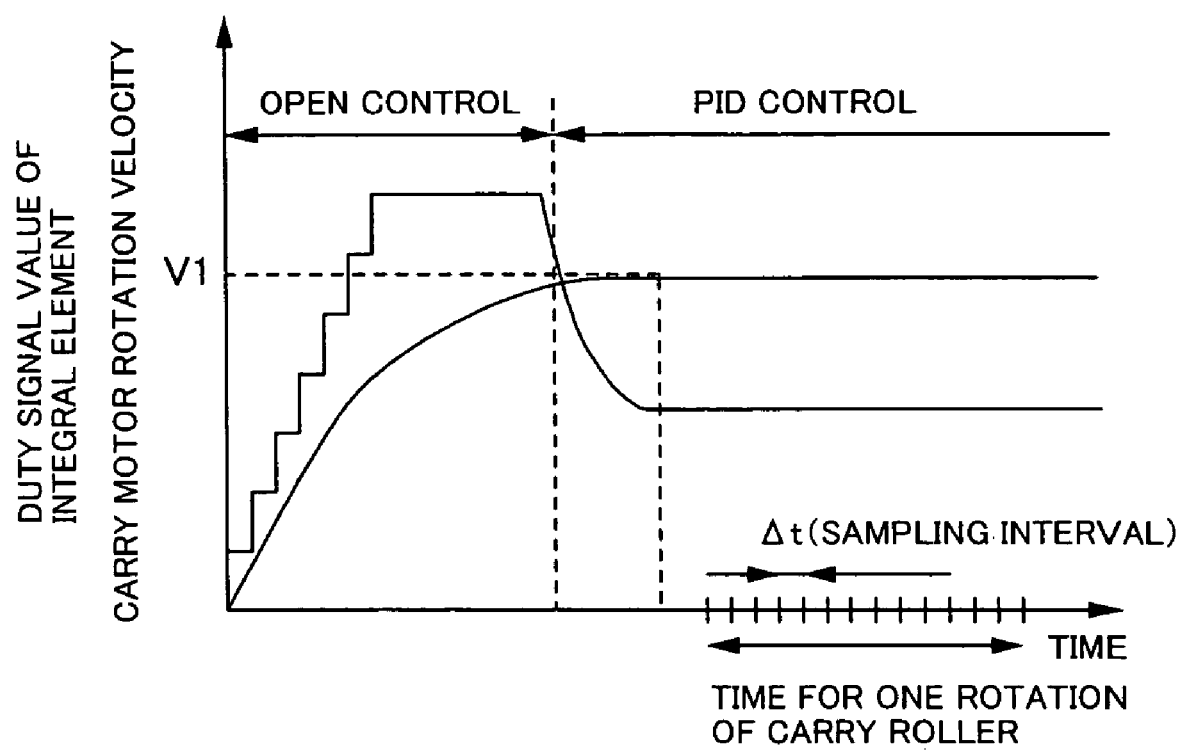
FIG. 15 is a graph of the change over time in the output value of the integral element and the carry motor rotation velocity.

FIG. 14 is a flowchart of the load measurement process. FIG. 15 is a graph of the change over time in the duty signal value (output value) of the integral element 76B and the carry motor rotation velocity during the load measurement process. The controller 60 controls the carry unit control circuit in accordance with a program stored on the memory 63 when the power is turned ON or the ink cartridge is replaced and performs the following processing.

First, the controller 60 activates the carry motor 22 (S101). In the initial acceleration region, the controller 60 performs acceleration control with open control to accelerate the carry motor until the rotation velocity of the carry motor 22 approaches the predetermined target rotation velocity V1.

Next, when the rotation velocity of the carry motor 22 approaches the target rotation velocity V1, the controller 60 switches from open control to PID control (S102). When driving of the CR motor 32 is continued with PID control, the difference between the rotation velocity and the target rotation velocity V1 of the carry motor becomes smaller.

When the difference between the rotation velocity and the target rotation velocity V1 of the carry motor falls below a predetermined value and the output signal value DXI of the integral element 76B becomes a substantially constant value, then the controller 60 records the output signal value DXI of the integral element 76B at a sampling interval $\Delta t$ (S103).

When the carry roller 23 has rotated once after the start of sampling (YES in S104), then the controller 60 calculates the average value DXIave of the N pieces of output signal values that have been sampled (S105).

When Econt is the constant voltage applied to the carry motor 22, Rm is the resistance of the carry motor 22, V1 is the rotation velocity of the carry motor 22, I is the current flowing through the carry motor 22 at the target rotation velocity V1, DXIave is the average of the output signal values of the integral element 76B obtained through load measurement, Ec is the motor counter-electromotive voltage coefficient, Kt is the motor torque, and the output value of the integral element indicating a duty percentage of 100% is 2000, then the following equation applies.

$$Kt \times I = Kt \times (DXIave \times Econt/2000 - V1 \times Ec)/Rm$$

Therefore, the following equation can be derived:

$$I = (DXIave \times Econt/2000 - V1 \times Ec)/Rm$$

Consequently, if the output value DXIave of the integral element 76B can be found with this load measurement, the current Ifuka flowing when the carry motor 22 is driven at the constant velocity V1 can be determined (S106).

It should be noted that due to individual differences among carry motors, the actual resistance value etc. of the carry motor may be different from the resistance value of the carry motor that is used for the above calculation. Therefore, when determining the current value Ifuka, a correction value for correcting the calculation error amount may be added to the current value I obtained through the above equation.

Temperature Estimation Process

<Calculation of the Heat Generation Amount Q1>

First, the carry motor's heat generation amount Q1 per carrying process is calculated. The heat generation amount Q1 is calculated by adding the acceleration-period heat generation amount Qbase and the constant-velocity-period heat generation amount Qc.

The acceleration-period heat generation amount Qbase can be found from the acceleration-period heat generation amount table once the carry amount has been determined. The constant-velocity-period heat generation amount Qc can be calculated as $Ifuka^2 \times tc$, based on the current Ifuka flowing through the carry motor during constant velocity and the time tc of rotation at constant velocity. It should be noted that the current value Ifuka is measured by the load measurement performed prior to printing. The time tc of rotation at constant velocity can be obtained by measuring the drive time tr of the carry motor during the carrying process and subtracting the acceleration time ta from this drive time. It should be noted that the acceleration time ta can be found by looking it up in the acceleration-period heat generation amount table once the carry amount has been determined.

As an example, a case in which the carry amount is 350 mm is described. The controller 60 analyzes the print data and determines the carry amount of the next carrying process to be 350 mm. The controller 60 references the acceleration-period heat generation amount table and instructs the carry unit control circuit 70 to control the carry motor 22 in the carry mode PS1. The carry unit control circuit 70 drives the carry motor 22 according to the carry mode PS1. Then, the drive time tr of the period during which the carry motor 22 is driven up to the target rotation position is measured with a drive time timer that is not shown in the figures. After driving of the carry motor 22, the controller 60 calculates the heat generation amount Q1 based on the following equation. It should be noted that Qb1 and ta1 in the equation are values that are determined by referring to the acceleration-period heat generation amount table.

$$Q1 = Qb1 + I_{fuka}^2 \times (tr - ta1) \quad (= Qbbase + Qc)$$

<Temperature Estimation Process>

Figure 16:
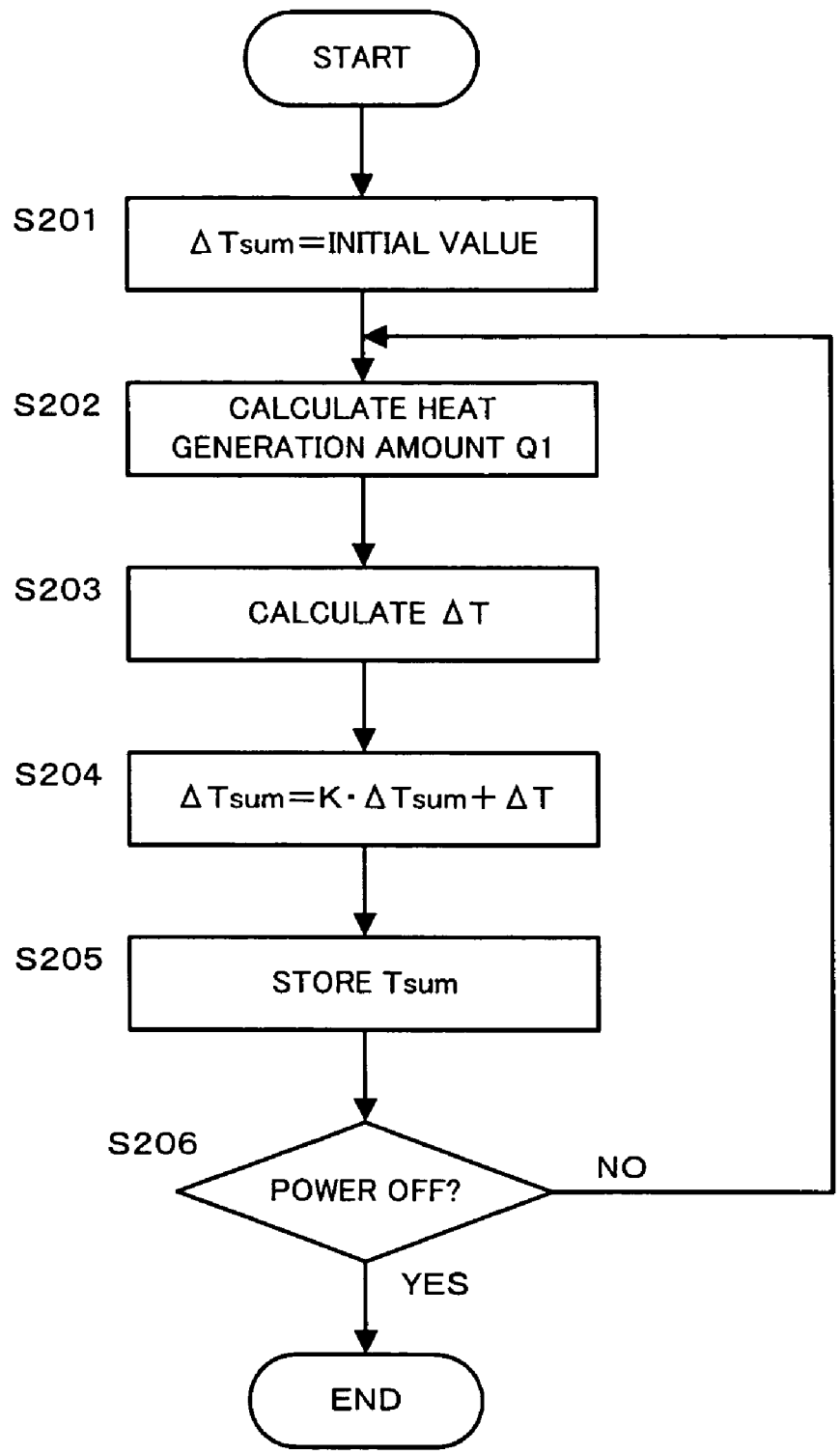
FIG. 16 is a flowchart of a temperature estimation process.

FIG. 16 is a flowchart of the temperature estimation process.

The temperature estimation process is constantly performed while the power is on, regardless whether the carry motor 22 is driven or halted. After the power is turned on, first the controller 60 sets the value of ΔTsum to an initial value (S201).

When there has been a carrying process, the controller 60 calculates the heat generation amount Q1 for that carrying process (S202). The calculation method is as described earlier.

Next, the controller 60 converts the heat generation amount Q1 into the heat generation temperature ΔT (S203). ΔT is determined from ΔT=Ka×Q1. Here, Ka is the conversion coefficient to convert the heat generation amount Q into the heat generation temperature ΔT, and is a value found experimentally beforehand and stored in the memory 63.

Next, the controller 60, taking natural heat radiation into account, calculates the total heat generation amount ΔTsum (ΔTsum=K·ΔTsum+ΔT) by adding the heat generation temperature ΔT to the value obtained by multiplying the known total heat generation temperature ΔTsum with a heat radiation coefficient K (S204).

The heat radiation coefficient K is K=exp(-t/τ) where t is the amount of time since calculation of the previous ΔTsum and τ is a time constant. The time constant τ is a value found experimentally in advance, and is stored in the memory 63. When a rest time is inserted between the intermediate drives of the carry motor 22 (explained later), then the time t used to calculate the heat radiation coefficient K becomes large, and thus the heat radiation coefficient K takes on a smaller value. For that reason, a long rest time of the carry motor 22 allows the total heat generation temperature ΔTsum to be kept from increasing.

The controller 60 stores the total heat generation temperature ΔTsum that has been calculated in a memory 63 such as a RAM. The total heat generation temperature ΔTsum is used when calculating the total heat generation temperature ΔTsum in the next carrying process. The controller 60 determines whether or not to perform heat generation restriction control based on the total heat generation temperature ΔTsum.

Heat Generation Restriction Control

Figure 17A:
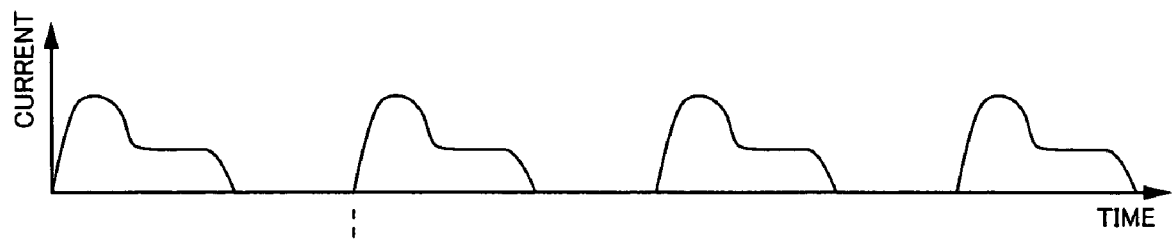
FIG. 17A is an explanatory diagram of the change over time of the current of the carry motor during normal operation.
Figure 17B:
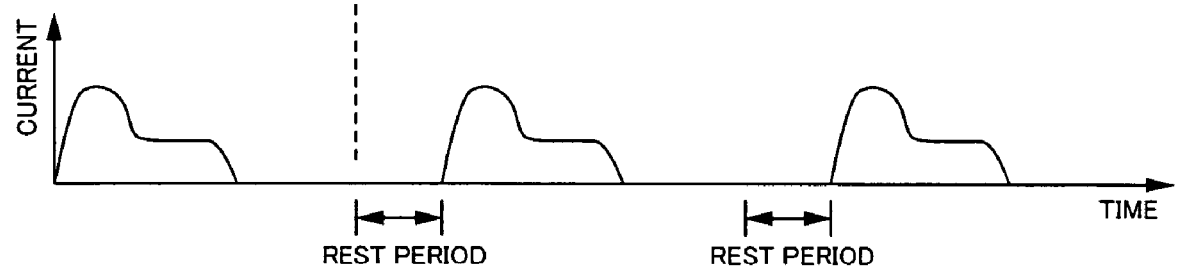
FIG. 17B is an explanatory diagram of the change over time of the current of the carry motor during heat generation restriction control.

FIG. 17A is an explanatory diagram of the change over time of the current of the carry motor 22 during normal operation (before performing heat generation restriction control). FIG. 17B is an explanatory diagram of the change over time of the current of the carry motor 22 during heat generation restriction control.

During normal operation, the controller 60 intermittently drives the carry motor 22 at predetermined intervals. It should be noted that between the intermittent driving of the carry motor 22, the carriage motor is driven to perform the dot formation process.

When intermittent driving of the carry motor 22 is continued, the temperature of the carry motor 22 rises. However, when the carry motor 22 rises to a high temperature, there may be quality concerns regarding the carry motor 22. On the other hand, when intermittent driving of the carry motor 22 is continued, the total heat generation amount temperature ΔTsum for estimating the temperature of the carry motor 22 also rises.

Accordingly, in this embodiment, when the total heat generation amount temperature ΔTsum has come to exceed a predetermined threshold value, then the controller 60 performs heat generation restriction control while driving the carry motor 22.

Heat generation restriction control is control in which a rest time is inserted between the intermittent drives of the carry motor 22 to increase the interval between the intermittent drives of the carry motor 22. With this heat generation restriction control, the heat of the carry motor 22 is dissipated, and the carry motor 22 can be kept from heating up to a high temperature.

However, when heat generation restriction control is performed, the intervals at which the carry motor 22 is driven are widened and this slows the printing speed, thereby prolonging the time required to print a single sheet of paper. For that reason, if heat generation restriction control is performed when the actual temperature of the carry motor 22 is low (when the estimated temperature of the carry motor 22 is calculated higher than the actual temperature), unnecessary heat generation restriction control is performed, thus reducing printing speed.

With the present embodiment, the estimated temperature of the carry motor 22 can be calculated with high precision, so that an unnecessary heat generation restriction control does not have to be performed, and the printing speed can be increased.

In this embodiment, whether or not to perform heat generation restriction control is determined based on whether or not the estimated temperature of the carry motor 22 exceeds a threshold value. However, it is also possible to set the length of the rest time in heat generation restriction control in correspondence with the estimated temperature of the carry motor 22.

Comparative Example

Figure 18A:
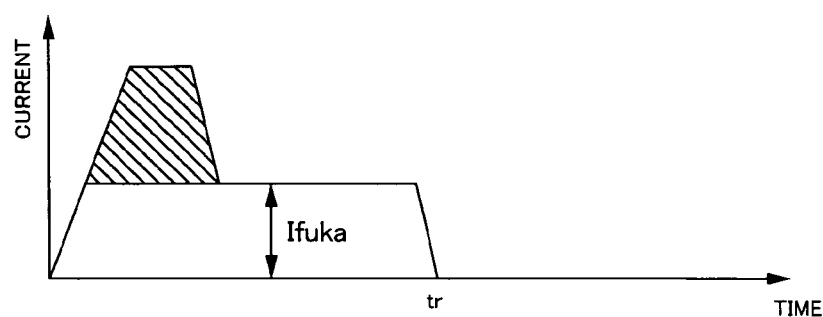
FIG. 18A is a graph of the change over time of the current of the carry motor.
Figure 18B:
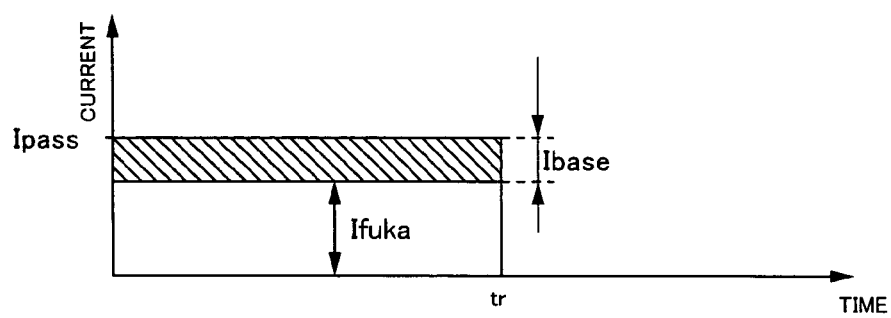
FIG. 18B is an explanatory diagram of a method of calculating the heat generation amount according to a comparative example.

FIG. 18A is a graph of the temporal change of the current flowing through the carry motor 22. FIG. 18B is an explanatory diagram of a method for calculating the heat generation amount according to a comparative example. Here, it is assumed that the carry amount is at least 400 mm, and that the carry mode PS0 is selected.

As shown in FIG. 18A, during the drive operation of one rotation, the rotation velocity of the carry motor 22 is accelerated and the carry motor 22 rotates at constant velocity when a predetermined velocity is attained, in accordance with the predetermined carry mode. When the carry motor 22 is accelerated, the current value of the carry motor 22 exceeds the current value Ifuka during rotation at constant velocity. This current portion (the hatched region in FIG. 18A) corresponds to an inertia component.

In the comparative example, the heat generation amount Qpass (=Ipass$^2$×t) is calculated from the effective current value Ipass. The effective current value Ipass is calculated by adding the constant current value Ifuka during constant velocity rotation and the current value Ibase of the inertia component.

Figure 18C:
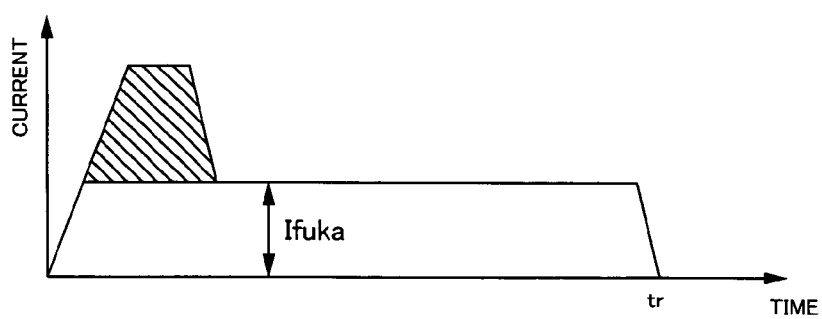
FIG. 18C is an explanatory diagram of a method of calculating the heat generation amount according to a comparative example when the constant velocity period becomes long.
Figure 18D:
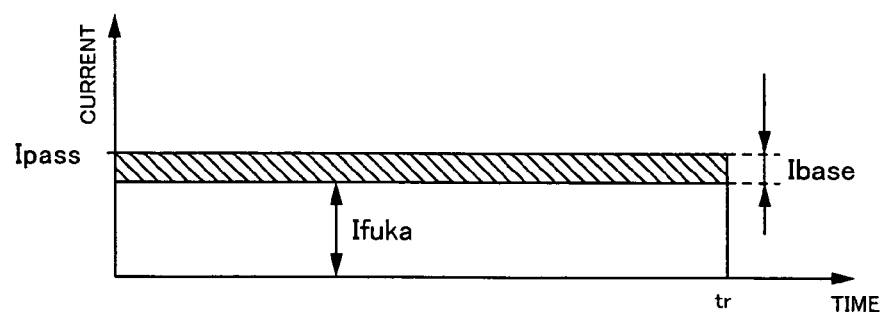
FIG. 18D is an explanatory diagram of a method of calculating the heat generation amount according to a comparative example when the constant velocity period becomes long.

FIG. 18C is an explanatory diagram of a method for calculating the heat generation amount according to a comparative example when the constant velocity period becomes long. FIG. 18D is an explanatory diagram of a method for calculating the heat generation amount according to a comparative example when the constant velocity period becomes long.

When the carry amount of the carry motor 22 becomes large, then the carry motor 22 carries the paper with a long constant velocity period in the same carry mode PS0. As can be seen from the hatched portion in FIG. 18C, when the carry amount becomes long, the proportion of the current of the inertia component becomes small with respect to the overall current value flowing during one driving operation. Therefore, when the carry amount becomes long, the effective current value Ipass must be calculated while making the current value Ibase of the inertia component small. That is to say, in this comparative example, Ibase must be listed in a table, in correlation with the carry amounts.

Figure 18E:
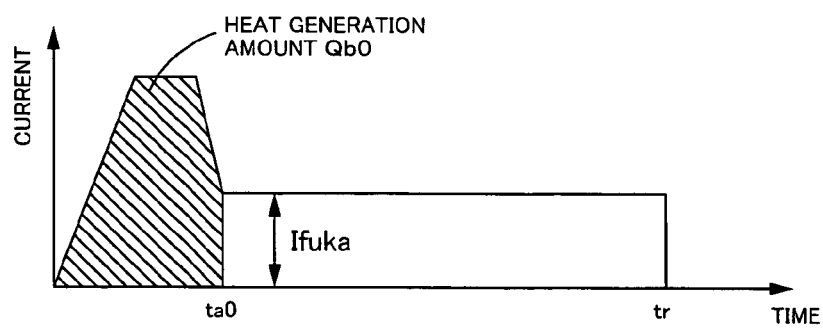
FIG. 18E is an explanatory diagram of a method of calculating the heat generation amount according to the present embodiment.

FIG. 18E is an explanatory diagram of a method for calculating the heat generation amount according to the present embodiment.

In the present embodiment, the heat generation amount (power consumption) of the motor during acceleration is stored in advance for each carry mode (in the above-described acceleration-period heat generation amount table). Also, in the present embodiment, the acceleration periods are stored in advance in the acceleration-period heat generation amount table. Further, in the present embodiment, the heat generation amount Q1 during one driving operation in the figures is calculated to be Q1=Qb0+Ifuka$^2$×(tr−ta0), for example.

In the present embodiment, for the same carry mode, the acceleration-period heat generation amount is the same, so that it is only necessary to store one data set for each carry mode. Therefore, the memory 63 does not have to be large, and a cost reduction of the apparatus can be achieved.

Different from the carriage motor, in the case of the carry motor, the drive amount may become large when the paper length becomes large. Therefore, the drive region when driving in the carry mode PS0 will be within a range of 400 mm plus the paper length. When Ibase is put into a table over such a wide range, as in the comparative example, then the amount of information that needs to be stored becomes enormous. By contrast, in the present embodiment, the acceleration-period heat generation amount is the same, so that it is only necessary to store one data set for each carry mode.

It should be noted however, that for different carry modes, the amount of heat generated during acceleration is different as well, so that it is necessary to store the heat generation amount for each carry mode in the acceleration-period heat generation amount table.

Also, in the present embodiment, the acceleration periods ta are stored in advance in the acceleration-period heat generation amount table. The drive time tr for which the carry motor 22 is driven up to the target rotation position is detected and the period of constant velocity is calculated. It should be noted however, that it is not necessarily required to determine the period of constant velocity in this manner. For example, if the timer measurement can be begun from the time when the driving at constant velocity has started, then it is not necessary to store the acceleration periods.

Also, in the present embodiment, the carry motor 22 is driven by PWM control. The controller drives the carry motor 22 through PWM control, and thus the current Ifuka that flows through the carry motor 22 cannot be found directly. Thus, the controller calculates Ifuka based on the output signal value DXI of the integral element 76B. Also, the present embodiment allows the value of the current flowing through the carry motor 22 to be calculated with high accuracy.

Moreover, in the present embodiment, the heat generation amount Q1 of the carry motor 22 is calculated from the current value Ifuka that flows through the carry motor 22 during printing. Thus, the temperature of the carry motor 22 can be estimated without providing a temperature sensor.

Moreover, in the present embodiment, the rest time of the carry motor 22 is determined from the current Ifuka that flows through the carry motor 22 during printing. More specifically, the heat generation amount Q1 is calculated based on Ifuka and when the estimated temperature that is calculated based on this heat generation amount exceeds a threshold value, then heat generation restriction control is started and a rest time is inserted between intermittent drives of the carry motor.

The printing speed is slowed down when heat generation restriction control is performed. With the printer of the present embodiment, however, the temperature of the carry motor 22 can be calculated with high accuracy, thus making it possible to obviate performing unnecessary heat generation restriction control.

Other Embodiments

The foregoing embodiment was described primarily with regard to a printer. However, the foregoing embodiment is for the purpose of elucidating the present invention and is not to be interpreted as limiting the present invention. The invention can of course be altered and improved without departing from the gist thereof and includes equivalents. In particular, the embodiments mentioned below are also included in the invention.

<Regarding the Acceleration-Period Heat Generation Amount Table>

The acceleration-period heat generation amount table described above (see FIG. 13) correlates the acceleration time ta, the acceleration-period heat generation amount Qbase, etc., and the carry amount with one another. This, however, is not a limitation. For example, the print mode may be correlated to the acceleration time ta and the acceleration-period heat generation amount Qbase, as described below.

Once the print mode is determined, the carry amount is set in accordance with the print mode. For example, if printing is to be performed at a resolution of 180 dpi on plain paper, then the carry amount is set to 1 inch, whereas if printing is to be performed at a resolution of 720 dpi on glossy paper, then the carry amount is set to $79/1440$ inches.

Therefore, the above-described acceleration-period heat generation amount table may correlate the paper type and print quality (resolution) to the acceleration time ta and the acceleration-period heat generation amount Qbase. In this way, the controller 60 can find the acceleration time ta and the acceleration-period heat generation amount Qbase from the paper type and print quality (resolution), instead of from the carry amount. It should be noted that once the acceleration time ta is determined, the controller 60 can calculate the constant-velocity-period heat generation amount Qc(=Ifuka$^2$×(tr−ta1)).

It goes without saying that other factors (such as whether or not to perform borderless printing) can be used instead of the paper type and print quality (resolution) in order to specify the print mode.

Even when the carry amount is the same, the acceleration time ta and the acceleration-period heat generation amount Qbase may differ, because the carry speed changes depending on the print mode. In view of this, by obtaining the acceleration time ta and the acceleration-period heat generation amount Qbase based on the print mode specified by the paper type and print quality (resolution), instead of the carry amount, it becomes possible to obtain the heat generation amount (power consumption) of the motor correctly.

<Regarding the Carriage Motor 32 (1)>

The foregoing embodiment described an example about the carry motor 22. This, however, is not a limitation. The foregoing is equally applicable to the carriage motor 32, for example, as described below in the same way as that for the carry motor 22.

The carriage motor 32 is a motor for moving the carriage 31, and during the dot formation process (see S003 of FIG. 5), it first accelerates the carriage 31 and then moves the carriage at a constant velocity to move the carriage 31 to a target position that is located beyond the print area. It should be noted that while the carriage 31 moves at a constant velocity, the controller 60 forms dots within the print area by ejecting ink from the head 41.

When the printer is being manufactured, an acceleration-period heat generation amount table for the carriage motor is created in the factory, and as with the carry motor (see FIG. 13), the acceleration-period heat generation amount table for the carriage motor is stored in advance on the memory 63. The acceleration-period heat generation amount table for the carriage motor correlates the amount of movement of the carriage, and the acceleration time ta and the acceleration-period heat generation amount Qbase etc. At a timing before printing is performed, such as when the power is turned ON, the controller 60 performs load measurement of the carriage motor 32, obtains in advance the current value Ifuka of the current flowing through the carriage motor 32 when it is driven at a constant velocity, and this is stored on the memory 63.

When the carriage 31 is to be moved up to a target position during printing, the controller 60 detects the time tc for which the carriage moves at a constant velocity. For example, the controller 60 measures the drive time tr from when the carriage motor 32 starts to drive until when it stops driving, and calculates the time tc for which the carriage moves at a constant velocity by subtracting the acceleration time ta, which is found from the acceleration-period heat generation amount table for the carriage motor, from the drive time tr. The constant-velocity-period heat generation amount Qc can be calculated from the time tc and the current value Ifuka (Qc=Ifuka$^2$×tc). Therefore, by adding the constant-velocity-period heat generation amount Qc to the acceleration-period heat generation amount Qbase, which is found from the acceleration-period heat generation amount table for the carriage motor, the heat generation amount of the carriage motor 32 can be calculated.

<Regarding the Carriage Motor 32 (2)>

Figure 19A:
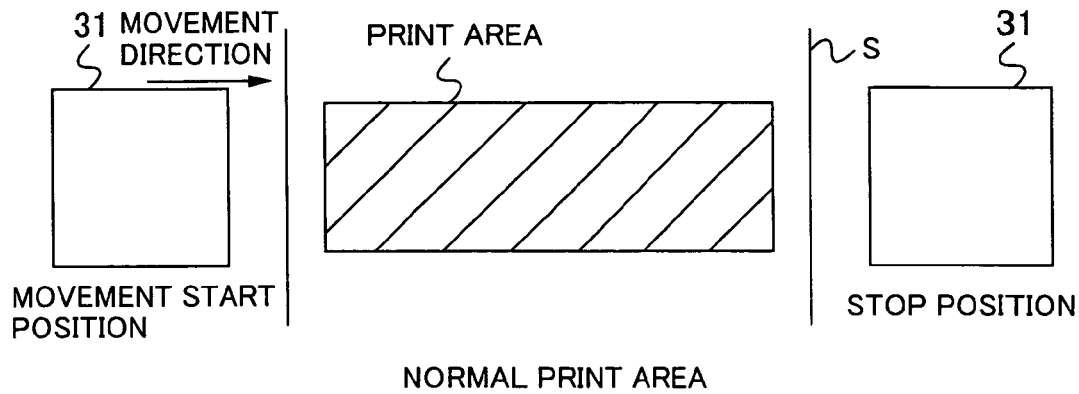
FIGS. 19A through 19C are explanatory diagrams showing relationships between the length of the print area and the amount of movement of the carriage.
Figure 19B:
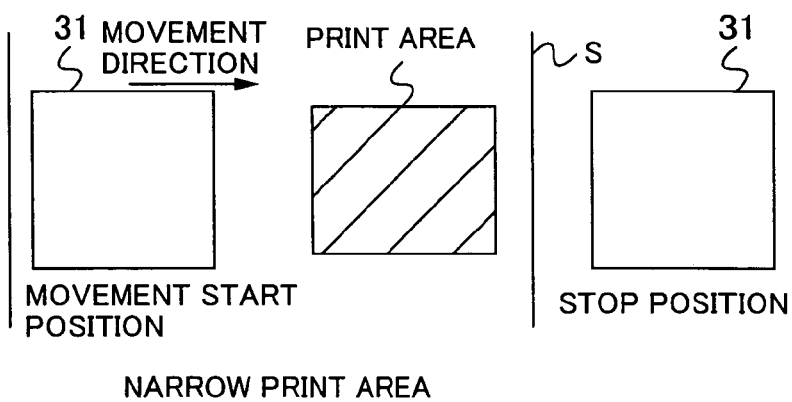
Figure 19C:
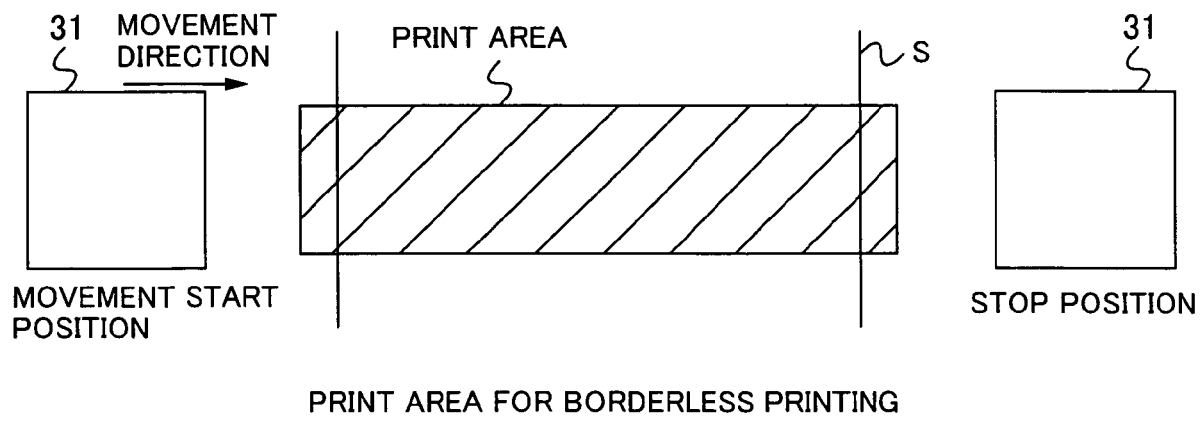

FIGS. 19A through 19C are explanatory diagrams showing relationships between the length of the print area and the amount of movement of the carriage.

FIG. 19A is an explanatory diagram showing a normal print area. In this case, the print area is set such that a predetermined margin is left in the side edges of the paper. The controller 60 ejects ink from the head 41 while the carriage 31 is moving at a constant velocity, thereby forming dots in the print area. Since acceleration is necessary to bring the carriage 31 to the constant velocity, the movement start position is set to a position as shown in the diagram.

When printing a photographic image on paper, dots are formed over almost the entire surface of the print area. Therefore, the length of the print area is substantially the same for all dot formation operations. For this reason, the movement distance of the carriage 31 is substantially the same when printing photographic images.

FIG. 19B is an explanatory diagram showing a narrow print area. When printing text images, the length of the print area may become short in the case of printing texts such as short sentences or lists. Accordingly, if the length of the print area is short, then the movement distance of the carriage 31 also becomes short.

FIG. 19C is an explanatory diagram showing a print area for borderless printing. When performing borderless printing, an image is printed on paper without forming any margins in the edges of the paper by setting the print area (area in which ink droplets are ejected) wider than the paper. Therefore, the print area for borderless printing is wider than the normal print area. Accordingly, when performing borderless printing, the movement distance of the carriage 31 becomes long.

Taking into consideration such differences in the movement distance of the carriage 31, the heat generation amount of the carriage motor 32 may be calculated based on print modes, as described below.

First, the controller 60 determines whether to print photographic images or to print text images. This determination is executed based on the settings of the printer 1, for example. Then, as described below, the controller 60 changes the way of obtaining the heat generation amount of the motor, depending on whether to execute a photograph-print mode for printing photographic images or to execute a text-print mode for printing text images.

In the case of printing photographic images, the print area is constant. Therefore, the movement distance of the carriage 31 is known, and thus, it is possible to find the acceleration time ta and the acceleration-period heat generation amount Qbase and calculate the heat generation amount. More specifically, by correlating the photograph-print mode, which is a print mode, and the acceleration time ta and the acceleration-period heat generation amount Qbase, and storing this correlation in the memory 63 in advance as an acceleration-period heat generation amount table, the controller 60 can find the acceleration time ta and the acceleration-period heat generation amount Qbase from the print mode, without having to obtain the movement distance of the carriage 31. It should be noted that in the case of printing photographic images, the acceleration time ta and the acceleration-period heat generation amount Qbase are predetermined values because the print area is constant. On the other hand, the controller 60 may determine whether to execute a normal photograph-print mode or to execute a borderless-printing mode, and find out the acceleration time ta and the acceleration-period heat generation amount Qbase and calculate the heat generation amount based on the determination results. Also in the case of borderless printing, the acceleration time ta and the acceleration-period heat generation amount Qbase are predetermined values because the print area is constant (although it is wider than the normal print area).

In the case of printing text images, the length of the print area can be determined by analyzing the print data. Therefore, it is possible to find out the acceleration time ta and the acceleration-period heat generation amount Qbase and calculate the heat generation amount based on the print data. More specifically, by correlating the length of the print area and the acceleration time ta and the acceleration-period heat generation amount Qbase, and storing this correlation in the memory 63 in advance as an acceleration-period heat generation amount table, the controller 60 can find the acceleration time ta and the acceleration-period heat generation amount Qbase based on the print data, without having to obtain the movement distance of the carriage 31.

It should be noted that once the acceleration time ta is found, the controller 60 can calculate the constant-velocity-period heat generation amount Qc ($=Ifuka^2 \times (tr-ta1)$).

Further, even when the movement distance of the carriage is the same, the acceleration time ta and the acceleration-period heat generation amount Qbase may differ, because the movement speed changes depending on the print mode. In view of this, by obtaining the acceleration time ta and the acceleration-period heat generation amount Qbase based on the print mode specified by the paper type and print quality (resolution), instead of the carriage movement distance, it becomes possible to obtain the heat generation amount (power consumption) of the motor correctly.

<Regarding the Printer>

In the above embodiment, a printer was described. However, there is no limitation to this. For example, technology like that of the present embodiment can also be adopted for various types of recording apparatuses that use inkjet technology, including color filter manufacturing devices, dyeing devices, fine processing devices, semiconductor manufacturing devices, surface processing devices, three-dimensional shape forming machines, liquid vaporizing devices, organic EL manufacturing devices (particularly macromolecular EL manufacturing devices), display manufacturing devices, film formation devices, and DNA chip manufacturing devices. Also, methods therefor and manufacturing methods are within the scope of application. When applying the present technology to these fields, the fact that liquid can be directly ejected (written) to a target object allows a reduction in material, process steps, and costs compared to conventional cases.

<Regarding the Ink>

Since the foregoing embodiment was an embodiment of a printer, a dye ink or a pigment ink was ejected from the nozzles. However, the liquid that is ejected from the nozzles is not limited to such inks. For example, it is also possible to eject from the nozzles a liquid (including water) including metallic material, organic material (particularly macromolecular material), magnetic material, conductive material, wiring material, film-formation material, electronic ink, machining liquid, and genetic solutions. A reduction in material, process steps, and costs can be achieved if such liquids are directly ejected toward a target object.

<Regarding the Nozzles>

In the foregoing embodiment, ink was ejected using piezoelectric elements. However, the method for ejecting liquid is not limited to this. Other methods, such as a method for generating bubbles in the nozzles through heat, may also be employed.

What is claimed is:

1. A method of controlling a motor, comprising the steps of:

preparing a motor control device provided with a motor for moving an object to be moved, said motor control device causing said motor to move said object to be moved to a target position by first accelerating said object to be moved and then moving said object to be moved at a constant velocity;

storing in advance an acceleration-period power consumption value corresponding to a power consumption of said motor during the accelerating movement;

storing in advance a current value of a current flowing through said motor when said object to be moved is moved at said constant velocity;

detecting a time for which said object to be moved is moved at said constant velocity when said object to be moved is moved to said target position;

calculating a constant-velocity-period power consumption value corresponding to a power consumption of said motor during the constant velocity movement of said object to be moved based on said time that has been detected and said current value; and calculating a power consumption of said motor for a period during which said object to be moved is moved to said target position based on said acceleration-period power consumption value and said constant-velocity-period power consumption value.

2. A method of controlling a motor according to claim 1, wherein said motor is a carry motor for carrying paper as said object to be moved.

3. A method of controlling a motor according to claim 1, wherein said motor is a carriage motor for moving a carriage as said object to be moved.

4. A method of controlling a motor according to claim 1, wherein there are at least two drive modes for said motor, one of said drive modes being selected in accordance with said target position; and wherein said acceleration-period power consumption value is stored in advance for each of said drive modes.

5. A method of controlling a motor according to claim 4, wherein an acceleration time is stored in advance for each of said drive modes; and wherein the time for which said object to be moved is moved at said constant velocity is detected based on said acceleration time.

6. A method of controlling a motor according to claim 5, wherein a time required for moving said object to be moved to said target position is measured; and wherein the time for which said object to be moved is moved at said constant velocity is calculated by subtracting said acceleration time from said time that has been measured.

7. A method of controlling a motor according to claim 1, wherein said motor is driven through PWM control.

8. A method of controlling a motor according to claim 1, wherein a temperature of said motor is estimated based on said power consumption for said period during which said object to be moved is moved to said target position.

9. A method of controlling a motor according to claim 1, wherein a rest time of said motor is determined in accordance with said power consumption for said period during which said object to be moved is moved to said target position.

10. A method of controlling a motor according to claim 3, wherein said power consumption of said motor for said period during which said object to be moved is moved to said target position is calculated based on print data.

11. A method of controlling a motor according to claim 10, wherein said acceleration-period power consumption value is obtained based on the print data.

12. A method of controlling a motor according to claim 10, wherein an acceleration time is obtained based on the print data; and wherein said constant-velocity-period power consumption value is obtained based on said acceleration time.

13. A method of controlling a motor according to claim 3, wherein said acceleration-period power consumption value is stored in advance related to a length of a print area.

14. A method of controlling a motor according to claim 13, wherein said acceleration-period power consumption value is obtained based on the length of the print area indicated in print data.

15. A method of controlling a motor according to claim 10, wherein said power consumption of said motor for said period during which said object to be moved is moved to said target position is obtained in a different way depending on a print mode.

16. A method of controlling a motor according to claim 15, wherein the acceleration-period power consumption value is a predetermined value when a photographic image is to be printed; and wherein, when a text image is to be printed, the acceleration-period power consumption value is obtained in accordance with a print area indicated in the print data.

17. A method of controlling a motor according to claim 15, wherein the acceleration-period power consumption value is obtained in accordance with whether or not borderless printing is to be performed.

18. A method of controlling a motor, comprising the steps of:
preparing a motor control device provided with a motor for moving an object to be moved, said motor control device causing said motor to move said object to be moved to a target position by first accelerating said object to be moved and then moving said object to be moved at a constant velocity;
storing in advance an acceleration-period power consumption value corresponding to a power consumption of said motor during the accelerating movement;
storing in advance a current value of a current flowing through said motor when said object to be moved is moved at said constant velocity;
detecting a time for which said object to be moved is moved at said constant velocity when said object to be moved is moved to said target position;
calculating a constant-velocity-period power consumption value corresponding to a power consumption of said motor during the constant velocity movement of said object to be moved based on said time that has been detected and said current value; and
calculating a power consumption of said motor for a period during which said object to be moved is moved to said target position based on said acceleration-period power consumption value and said constant-velocity-period power consumption value;
wherein said motor is a carry motor for carrying paper as said object to be moved;
wherein there are at least two drive modes for said motor, one of said drive modes being selected in accordance with said target position;
wherein said acceleration-period power consumption value is stored in advance for each of said drive modes;
wherein an acceleration time is stored in advance for each of said drive modes;
wherein a time required for moving said object to be moved to said target position is measured;
wherein the time for which said object to be moved is moved at said constant velocity is calculated by subtracting said acceleration time from said time that has been measured;
wherein said motor is driven through PWM control;
wherein a temperature of said motor is estimated based on said power consumption for said period during which said object to be moved is moved to said target position; and
wherein a rest time of said motor is determined in accordance with said power consumption for said period during which said object to be moved is moved to said target position.

19. A motor control device comprising:
a motor for moving an object to be moved, said motor being configured to move said object to be moved to a target position by first accelerating said object to be moved and then moving said object to be moved at a constant velocity;
a memory for storing in advance
an acceleration-period power consumption value corresponding to a power consumption of said motor during the accelerating movement, and
a current value of a current flowing through said motor when said object to be moved is moved at said constant velocity; and
a controller configured to
detect a time for which said object to be moved is moved at said constant velocity when said object to be moved is moved to said target position,
calculate a constant-velocity-period power consumption value corresponding to a power consumption of said motor during the constant velocity movement of said object to be moved based on said time that has been detected and said current value, and
calculate a power consumption of said motor for a period during which said object to be moved is moved to said target position based on said acceleration-period power consumption value and said constant-velocity-period power consumption value.

20. A printing method comprising the steps of:
preparing a printing apparatus provided with a motor for moving an object to be moved, said printing apparatus causing said motor, to move said object to be moved to a target position by first accelerating said object to be moved and then moving said object to be moved at a constant velocity;

storing in advance an acceleration-period power consumption value corresponding to a power consumption of said motor during the accelerating movement;

storing in advance a current value of a current flowing through said motor when said object to be moved is moved at said constant velocity;

detecting a time for which said object to be moved is moved at said constant velocity when said object to be moved is moved to said target position;

calculating a constant-velocity-period power consumption value corresponding to a power consumption of said motor during the constant velocity movement of said object to be moved based on said time that has been detected and said current value; and calculating a power consumption of said motor for a period during which said object to be moved is moved to said target position based on said acceleration-period power consumption value and said constant-velocity-period power consumption value.

* * * * *